US009314941B2

United States Patent
Wallen et al.

(10) Patent No.: US 9,314,941 B2
(45) Date of Patent: Apr. 19, 2016

(54) AGGREGATE-BASED MANDRELS FOR COMPOSITE PART PRODUCTION AND COMPOSITE PART PRODUCTION METHODS

(75) Inventors: Matt Wallen, Tucson, AZ (US); Jens Rossfeldt, Green Valley, AZ (US)

(73) Assignee: ADVANCED CERAMICS MANUFACTURING, LLC, Tucson, AZ (US)

( * ) Notice: Subject to any disclaimer, the term of this patent is extended or adjusted under 35 U.S.C. 154(b) by 0 days.

(21) Appl. No.: 13/482,721

(22) Filed: May 29, 2012

(65) Prior Publication Data

US 2012/0228467 A1 Sep. 13, 2012

Related U.S. Application Data

(60) Continuation-in-part of application No. 12/794,502, filed on Jun. 4, 2010, now Pat. No. 8,715,408, which is a division of application No. 12/170,297, filed on Jul. 9, 2008, now abandoned.

(60) Provisional application No. 60/949,765, filed on Jul. 13, 2007, provisional application No. 61/490,461, filed on May 26, 2011.

(51) Int. Cl.
*C04B 28/26* (2006.01)
*B28B 7/34* (2006.01)
(Continued)

(52) U.S. Cl.
CPC .............. *B28B 7/346* (2013.01); *B28B 13/021* (2013.01); *B29C 33/3807* (2013.01); *B29C 33/52* (2013.01); *B29C 43/34* (2013.01);
(Continued)

(58) Field of Classification Search
CPC ........................................................ C04B 28/26
USPC ............................... 106/600, 38.2, 603
See application file for complete search history.

(56) References Cited

U.S. PATENT DOCUMENTS 3,425,982 A * 2/1969 Fink .............................. 524/413
3,666,455 A * 5/1972 Olstowki ....................... 419/11
(Continued)

FOREIGN PATENT DOCUMENTS

JP          54-126626        10/1979

OTHER PUBLICATIONS

JP 54126626 A (Oct. 2, 1979) abstract only.*
(Continued)

*Primary Examiner* — Paul Marcantoni
(74) *Attorney, Agent, or Firm* — Troutman Sanders LLP; Ryan A. Schneider; Troy S. Kleckley

(57) ABSTRACT

A method for forming a composite structure, using a mandrel that is later removed from the composite structure, involves production of a mandrel by depositing a particulate mixture, including an aggregate and a binder, into a mold and removing the mandrel from the mold. The mandrel may be treated while still in the mold by heating, curing with an agent, microwave energy, or by some combination thereof. Once finished, the mandrel can be used in manufacturing polymer and/or composite components. The mandrel can also include materials that can be easily removed from the finished composite structure by water, shakeout, chemically dissolving, or by some combination thereof. The mandrel can be a self-expanding mandrel, and can be used in a process or system for the manufacture of composite structures.

13 Claims, 16 Drawing Sheets

(51) Int. Cl.
  *B28B 13/02* (2006.01)
  *B29C 33/38* (2006.01)
  *B29C 33/52* (2006.01)
  *B29C 43/34* (2006.01)
  *B29C 70/34* (2006.01)
  *B29C 33/10* (2006.01)
  *B29C 70/32* (2006.01)
  *B29C 35/08* (2006.01)
  *B29C 43/00* (2006.01)

(52) U.S. Cl.
  CPC .............. *B29C 70/342* (2013.01); *B29C 33/10* (2013.01); *B29C 43/003* (2013.01); *B29C 70/32* (2013.01); *B29C 2035/0855* (2013.01); *B29C 2043/3444* (2013.01); *B29C 2043/3488* (2013.01)

(56) References Cited

U.S. PATENT DOCUMENTS

| | | | |
|---|---|---|---|
| 3,719,608 A * | 3/1973 | Olstowski | 252/506 |
| 3,778,283 A | 12/1973 | Freyhold | |
| 3,801,334 A | 4/1974 | Dewey, Jr. | |
| 3,919,162 A | 11/1975 | Austin | |
| 4,159,302 A | 6/1979 | Greve et al. | |
| 4,196,011 A | 4/1980 | Koike | |
| 4,226,277 A | 10/1980 | Matalon | |
| 4,329,177 A | 5/1982 | George | |
| 4,341,559 A | 7/1982 | Friedemann et al. | |
| 4,416,694 A * | 11/1983 | Stevenson et al. | 106/634 |
| 4,430,450 A * | 2/1984 | Senda et al. | 521/60 |
| 4,433,029 A * | 2/1984 | Senda et al. | 428/407 |
| 4,473,526 A | 9/1984 | Buhler et al. | |
| 4,480,681 A | 11/1984 | Alexander et al. | |
| 4,504,314 A | 3/1985 | Barker et al. | |
| 4,596,834 A | 6/1986 | Widener et al. | |
| 4,683,118 A | 7/1987 | Hayashi et al. | |
| 4,750,540 A | 6/1988 | Boenisch | |
| 5,076,986 A | 12/1991 | Delvaux et al. | |
| 5,162,060 A | 11/1992 | Bredow et al. | |
| 5,169,577 A | 12/1992 | Feichtinger | |
| 5,215,697 A | 6/1993 | Toki et al. | |
| 5,262,100 A * | 11/1993 | Moore et al. | 264/489 |
| 5,294,393 A | 3/1994 | Toki et al. | |
| 5,366,684 A | 11/1994 | Corneau, Jr. | |
| 5,382,289 A | 1/1995 | Bambauer et al. | |
| 5,386,777 A * | 2/1995 | Lou et al. | 102/291 |
| 5,611,853 A | 3/1997 | Morimoto | |
| 5,656,195 A | 8/1997 | Mielke et al. | |
| 5,849,229 A | 12/1998 | Holtzberg | |
| 5,944,888 A | 8/1999 | Perich et al. | |
| 5,977,195 A * | 11/1999 | Craig et al. | 521/78 |
| 6,045,745 A * | 4/2000 | Reno | 264/517 |
| 6,090,195 A | 7/2000 | Andersen et al. | |
| 6,139,619 A | 10/2000 | Zaretskiy et al. | |
| 6,299,677 B1 * | 10/2001 | Johnson et al. | 106/38.2 |
| 6,325,958 B1 * | 12/2001 | Lombardi et al. | 264/86 |
| 6,344,160 B1 | 2/2002 | Holtzberg | |
| 6,437,034 B2 | 8/2002 | Lombardi et al. | |
| 6,505,671 B1 | 1/2003 | McKibben et al. | |
| 6,648,965 B2 | 11/2003 | Klus | |
| 6,828,373 B2 * | 12/2004 | Artz et al. | 524/492 |
| 6,843,303 B2 | 1/2005 | Siak et al. | |
| 6,846,358 B2 | 1/2005 | Francis | |
| 7,163,045 B2 | 1/2007 | Herreid et al. | |
| 7,168,045 B2 | 1/2007 | Fliess et al. | |
| 7,651,556 B2 * | 1/2010 | Komiyama et al. | 106/14.44 |
| 2003/0132563 A1 | 7/2003 | Palmer et al. | |
| 2004/0228995 A1 | 11/2004 | Boaz et al. | |
| 2004/0238157 A1 | 12/2004 | Hori et al. | |
| 2005/0116136 A1 | 6/2005 | Artz et al. | |
| 2006/0071364 A1 | 4/2006 | Zenpo et al. | |
| 2007/0246182 A1 | 10/2007 | Bovens | |
| 2011/0136602 A1 | 6/2011 | Hsu et al. | |
| 2012/0118487 A1 | 5/2012 | Havens et al. | |

OTHER PUBLICATIONS

JP 60082247 A (May 10, 1985) abstract only.*
JP 54126626 A Oct. 2, 1979 Machine Translation into English.*
Inorganic Binder Article, Beachbox® LaempeKuhs—Binder 2005.
International Search Report and Written Opinion for PCT Application No. PCT/US08/69555, mailed Oct. 1, 2008.

* cited by examiner

AGGREGATE-BASED MANDRELS FOR COMPOSITE PART PRODUCTION AND COMPOSITE PART PRODUCTION METHODS

RELATED APPLICATIONS

This application is a continuation-in-part of U.S. patent application Ser. No. 12/794,502, filed on Jun. 4, 2010, which is a divisional application of U.S. patent application Ser. No. 12/170,297, filed Jul. 9, 2008, now abandoned, which claimed priority to U.S. Provisional Patent Application No. 60/949,765, filed on Jul. 13, 2007. This application also claims, under 35 U.S.C. §119(e), the benefit of U.S. Provisional Patent Application Ser. No. 61/490,461, filed May 26, 2011. The entire contents, references and substance of all the above are hereby incorporated by reference as if fully set forth below.

TECHNICAL FIELD

The present invention relates to a process and method for producing composite parts. In particular, this invention relates to mandrels for the mass production of polymer or composite structures, and to processes and methods for forming such mandrels at sufficient rates for mass production. This disclosure relates to materials and methods for the production of complex components utilizing a self-expanding material to apply pressure to a composite material for controlled consolidation of the composite material to form a composite structure. The self-expanding material after inducing consolidation of the composite can be removed quickly with water.

BACKGROUND

Composite materials, such as fiber-reinforced composites, can be used to produce corrosion resistant and lightweight structures. "Composite material," as used herein, refers to a material comprised of two or more separate materials, which may include a fiber or polymer binder or a combination of the two. The most common composites are normally comprised of a fiber (Glass, Kevlar, Carbon, etc) impregnated with a polymer (Epoxy, Polyester, Urethane, etc). In comparison to lightweight metals such as aluminum, structures formed of composite materials have high strength-to-weight and high stiffness-to-weight ratios. As a result, composite materials have been used to fabricate a wide variety of structures including, most notably, aircraft structures.

In the aircraft industry, composite components were initially limited to secondary structures such as floorboards and engine cowlings due to limited experience with designing composite structures. However, as the mechanics of composite materials became better understood and higher quality materials were developed, its use increased as primary aircraft components such as flaps, wing sections, and even as the entire fuselage.

Currently, aircraft exist that have a fuselage and wings made substantially or entirely from composite materials. Aircraft manufacturers have increased their dependence upon composite materials to meet their ever-increasing demands for improved efficiency and lower costs. Composite materials also are used in automotive, recreational, military and defense applications, where the performance requirements may be even more demanding.

A significant drawback to the use of composite structures in aerospace applications, whether commercial or military, is the complicated and expensive tooling that is required for their fabrication, particularly when a seamless, hollow structure is desired. To form a seamless, hollow composite structure, the use of a mandrel or mold core is often preferred. The composite materials, generally fiber and resin, are laid up on the mandrel and cured by applying heat, time and pressure according to well-known methods. For many applications, the mandrel is a single use mold/tool that is destructively removed from the finished part either by a chemical process or by mechanical agitation.

Mandrels for composite structures are often made of plaster. Plaster easily pours into a mold and forms a solid structure but requires a significant curing time. Moreover, plaster is generally removed by mechanical agitation which can result in damage to the composite structure, after which the material is discarded as waste.

Other conventional materials used for making tooling such as mandrels include eutectic salts. These materials pose certain processing problems associated with removal of the materials from the cured parts, as well as with the disposal of the materials. Salt mandrels are brittle and must be cast into the desired shape while molten to avoid the need to machine them. Moreover, despite being soluble in water, eutectic salts produce corrosive, environmentally unfriendly waste streams when washed from the cured composite part.

An alternative method for producing a seamless, hollow composite part is to use an inflatable bladder as a mandrel within a reusable female mold form. Such a method is disclosed, for example, in U.S. Pat. No. 5,366,684. Upon inflation, the bladder presses the laid-up composite into the female mold form. The bladder process, however, is not useful for complex shapes and does not produce a composite structure with the same accuracy as a more conventional molded mandrel, particularly where the internal dimensions of the part are critical.

More recent improvements in mandrel materials provide organic and inorganic binders that are environmentally benign and water-soluble. The mandrel material is a composite blend including a matrix, such as sand, a binder, and water. One such binder is polyvinylpyrrolidone, or "PVP". The composite blend is prepared to a desired consistency, formed into a desired shape and cured. The resulting mandrel is strong and lightweight and easily can be shaped and subsequently removed from cured composite parts. Additives may be added to enhance the functional characteristics of the finished tooling material. These types of mandrel materials are disclosed, for example, in U.S. Pat. Nos. 6,325,958 and 6,828,373, both of which are incorporated by reference herein.

Utilizing the above processes (excluding the bladder technique) mandrels are currently formed using similar techniques, which involve the use of either a pourable material, such as eutectic salt or plaster, or a compressible material such as PVA and aggregate or sodium silicate and aggregate. Each of these processes can be very labor and time intensive.

Eutectic salts mandrels require the salt to be melted at temperatures in excess of 350° F. and, once molten, must be manipulated into a mold where it must cool and set for extended periods of time, often causing burns unless special protective clothing is worn. Further depending on the complexity of the mold and exposed cross section, significant amounts of water and time are needed to remove the eutectic salt from the mold, which also creates a highly corrosive waste stream.

Plaster is a more user friendly material, in that it can be prepared at room temperature and poured into a complex mold, but it also has several disadvantages. Since plaster is formed from the hydration of dehydrated salts, it is prepared from a dry powder material that is combined with water, which must be agitated to ensure proper mixing of the powder and water. This agitation leads to the formation of air bubbles within the material that can form significant defects in the resultant mandrel. Further, the plaster must be allowed to set, which is controlled by the temperature that the plaster is mixed at, as well as by additives to the mixture. Since this is normally a manual process, set times are around 10 min and can take as long as 45 min. Once set, the mandrel can be removed from the mold, but is not ready for composite layup, since it still contains significant amounts of water. This water must be removed to a sufficient level so as not to react with the composite system when the part is brought to temperature. Plaster is extremely time and energy intensive to dry since it forms a dense egg shell like skin, which acts as a heat and water barrier. Once a finished composite part is formed, the plaster material is either partially or completely water insoluble. Mechanical methods are then used to remove the mandrel often damaging the composite due to delamination.

Prior works have attempted to produce a water soluble plaster material that aids in the removal of the core from the finished composite part, but has come at the cost of reduced strength in the core. Further since these water soluble plasters still incorporate large amounts of water to pour the material there is a significant amount of time and energy needed to cure and dry the core.

Existing compressed material mandrels are comprised of moist sand-like materials that are packed or compressed into a mold to form the required shape. These materials can be labor intensive or require expensive tooling since the materials must normally be packed at high pressure to ensure uniformity in the mandrel. Further, complex shapes are very difficult to form since the materials are not very flowable and, as such, don't tend to fill molds with reverse cavities. However, since these materials start out with a very low density and open porosity, they can be readily dried or cured using a variety of techniques, for example $CO_2$ curing, hot gas infiltration, vacuum drying, microwave or oven drying.

While these prior art practices provide improvements that have shortened processing time and overall costs, the manufacturing cost of a composite structure is still relatively high. Consequently, there remains a need for a simplified method for manufacturing composite parts. In particular, a need exists for simplified methods of formation of mandrels and for removal of mandrels from a seamless, hollow composite part.

SUMMARY

In one broad aspect, the invention relates to the production of complexly shaped mandrels with high precision without a pourable material that contains excess water. According to this aspect, the invention further eliminates the difficulties associated with mandrels produced by compression of materials such as by means of mechanical compaction that can result in uneven form filling. The above problems can be mitigated by transforming the aggregate/binder mixture into a fluidized state by application of kinetic energy to the mixture. In one embodiment, kinetic energy is imparted into a non liquid mandrel material, such as a binder/aggregate mixture, through a carrier fluid (most commonly a gaseous fluid such as air or nitrogen), by which the solids are able to be displaced as a semi fluid. Once in the semi fluid state, the mixture can then be directed/injected/blown into a mold in a similar fashion as a pourable material. As the material enters the mold, the carrier fluid is removed through properly placed vents while the material is remains contained in the mold. This technique affords the fast production of aggregate based mandrels that can readily be dried/cured using a host of processes, such as gas cure or heat drying.

In general, aspects of the present invention relate to methods of manufacturing composite structures wherein high quality mandrels can be produced in a relatively short period of time. Various arrangements for forming and curing mandrels are disclosed that may be used in an industrial or automated process whereby a large number of high quality mandrels may be made quickly and inexpensively.

Other aspects of the present invention relate to a method for forming a composite structure using a mandrel, wherein the mandrel is mass produced in a mold by filling the mold with a particulate mixture, including one or more aggregates and one or more binders, and removing the formed mandrel from the mold while the mandrel is still partially green, i.e before reaching full cure. According to further aspects, the mandrel may be fully set or cured while still in the mold e.g. by heating, vacuum, curing with an agent, microwave energy, or by some combination thereof, or simply time.

Additional aspects of the invention relate to mandrel material compositions that can be cured quickly, thereby facilitating a mechanized or automated process for mandrel mass production. Further aspects of the invention relate to mandrel material compositions that may provide mandrels having sufficient strength with little or no curing such that the mandrel may be handled, stored, or shipped, wherein curing may be completed at a later time or even over time during the course of storage or shipment. Further, the invention may make use of other currently available water soluble binders for producing composite mandrels depending on the necessary properties.

Still further aspects of the invention relate to methods of manufacturing composite structures wherein the mandrel materials may be environmentally benign and water-soluble. Moreover, aspects of the invention allow for the reclamation of mandrel materials for reuse to further reduce costs and minimize the impact on the environment.

The products and methods described herein are especially useful for forming mandrels for producing lightweight composite structures, e.g. for the transportation industry, such as aircraft or aerospace industry, and will be described in connection with such utility, although other utilities are contemplated.

Another embodiment of the disclosure includes water soluble self-expanding mandrels that can contain a water soluble binder and an expandable material. The binder can be an organic or inorganic binder. The expandable material can be a material that expands when subjected to heat, light, energy or chemical reaction. The expandable material can be an expandable graphite or expandable polymer particle, and the expandable mandrel can compress a composite material that is on the surface of the mandrel against another surface, such as in a tool or mold.

A further embodiment includes a process for preparing composite structures using an self-expanding mandrel and a tool or mold. Yet another embodiment includes a system for manufacturing composite structures, including a composite material, a self-expanding mandrel.

BRIEF DESCRIPTION OF DRAWINGS

To understand the present invention, it will now be described by way of example, with reference to the accompanying drawings in which.

DETAILED DESCRIPTION

Further features and advantages of the present invention will be seen from the following detailed description, in which is shown various embodiments of the present invention. It is understood that other embodiments may be utilized and changes may be made without departing from the scope of the present invention.

The present invention relates to devices and methods for forming mandrels for use in the production of hollow composite structures, which devices and methods may be used for mass production of such mandrels. The mandrels are typically made from sand or other aggregate held together in the desired shape by means of a binder, and may include additional ingredients as well. In one embodiment, the process used to form the mandrel comprises mixing the aggregate with the binder, forming the mixture into the desired shape, then treating the mixture so that the binder hardens sufficiently so that the mandrel can be handled.

In various embodiments of the present invention, an aggregate material and a binder material, mixed to form a non-fluid aggregate/binder mixture, can be fluidized by imparting kinetic energy to the mixture, which allows the mixture to be inserted into a mold in a fluid manner. It is understood that the aggregate material and the binder material may contain more than one aggregate or binder, respectively. This aggregate/binder mixture may have a moist sand-like consistency in some embodiments. In one embodiment, such a non-fluid mixture may be fluidized by imparting kinetic energy into the mixture through entraining the mixture in a carrier fluid (such as air or nitrogen), allowing the solids to be displaced as a fluid. Once in the fluidized state, the mixture can then be directed/injected into a mold in a similar fashion as a pourable material. As the material enters the mold, the carrier fluid is removed, such as through properly placed vents, while the non-fluid mixture remains and is contained within the mold, filling the mold. Such techniques can afford the fast production of aggregate based mandrels that can be readily be dried/cured using a host of processes, such as gas cure or heat drying, as described below. It is understood that other means and techniques for fluidizing the aggregate/binder mixture may be used in accordance with the present invention. It is also understood that fluidizing the mixture involves causing a non-fluid material to behave in a fluid manner, but does not include transforming the material into a fluid phase (such as a liquid or gas).

Figure 1:
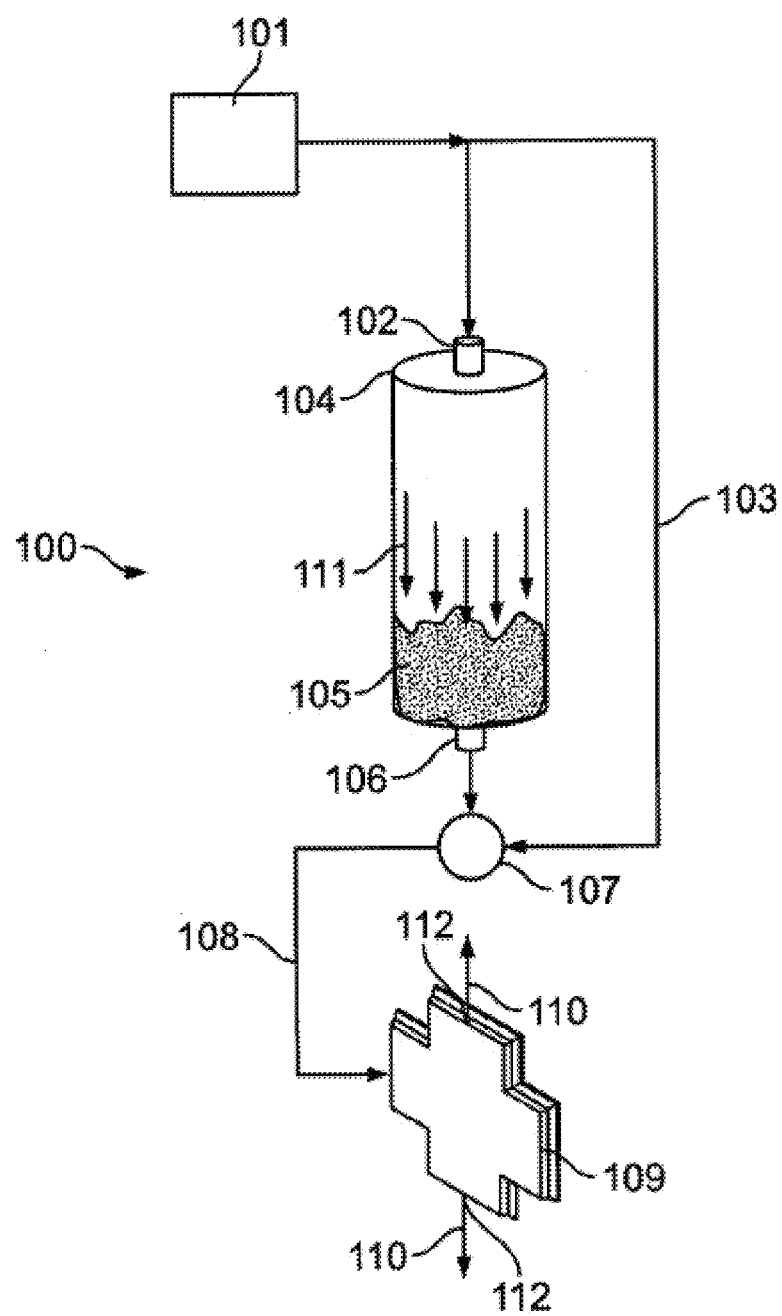
FIG. 1 is a schematic diagram of one embodiment of a system for mandrel fabrication using a pressurized material injection vessel.

In one exemplary embodiment, the aggregate/binder mixture can be carried into a mold using a pressurized material injection vessel 100 (e.g., a sand blaster), as illustrated in FIG. 1. The aggregate/binder mixture 105 is first placed into the sand blaster tank 104, and the tank 104 is sealed and an air supply 101 is connected thereto. The air supply 101 is split to provide air to the tank 104 through an entry valve 102 and also to a mixing valve 107 located downstream from the tank 104, through a separate line 103. When the entry valve 102 is opened to the system, air 111 is forced through the tank 104 toward the exit orifice 106 at the base of the tank. The aggregate mixture 105 is propelled along with the air 111 out of the tank 104 toward the mixing valve 107. As the aggregate mixture 105 enters the mixing valve 107 it is mixed with air from line 103 and propelled out into a fill tube 108 which directs the mixture to the cavity of a mold or tool 109. The aggregate mixture 105 collects in the mold and forms a mandrel in the shape of the mold 109. The second air stream (from line 103) that is passed through the mixing valve 107 may be forced at a sufficient rate so as to induce a venturi effect on the tank orifice 106, which helps draw the aggregate mixture into the air stream.

Once the aggregate mixture is entrained in the air stream, the aggregate can be directed as a fluid into a range of molds or properly vented housings for the ultimate production of the desired shape, such as the mold 109 shown in FIG. 1. Vents 112 within the mold 109 allow the fluidized material to move to the desired region in the mold 109, at which point the aggregate mixture 105 is separated from the air stream, which exits the mold to the environment, illustrated by arrows 110. In this embodiment, it may be desirable to mechanically agitate the sand blaster's tank 104, where the mixture 105 is stored, to ensure that the aggregate mixture 105 does not bridge as material is removed from the chamber, causing air pockets in the exiting stream. In one embodiment, after filling the mold 109, the fill tube 108 for the mold 109 can be used to infiltrate the mold 109 with a cure gas to cure the mandrel (as described below) using the same flow path as the injection of the mixture 105. Other gassing configurations are also possible, as well as other non-gaseous curing techniques.

Figure 2:
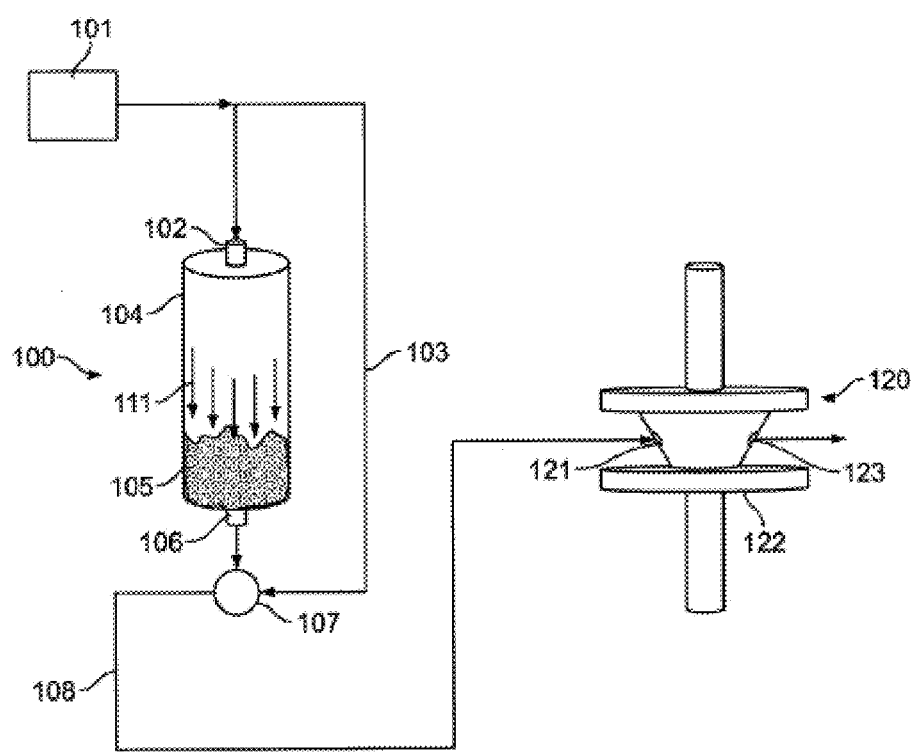
FIG. 2 is a schematic diagram of another embodiment of a system for mandrel fabrication using a pressurized material injection vessel and a pressing mechanism.

In another embodiment, the injection vessel 100 of FIG. 1 can be combined with a compaction system 120 as shown in FIG. 2. Similarly to the process discussed above the injection vessel 100 is utilized to propel the aggregate/binder mixture 105 into the mold fill line 108. In this embodiment, the material is directed into a mold 121 that is held in place under force from an external press 122. As in the mold 109 described above, the fluid is able to escape from the mold 121 through vents 123, while the mixture 105 remains in the mold 121. Once the mixture 105 has filled the mold 121 and the fluid has exited completely through the vent system 123, additional compaction of the formed mandrel can be accomplished through increased mechanical force using the external press 122. In this embodiment, the mold 121 is specifically designed to allow for the cavity of the mold 121 to be filled and then compressed further to a final strength. The mold 121 may thus include complementary surfaces designed to allow room for parts of the mold 121 to move during compression. This configuration can create additional compaction and densification of the mandrel material. Although a vertical press configuration is shown, other types of pressing configurations may be used, including horizontal or isostatic pressing.

Figure 3:
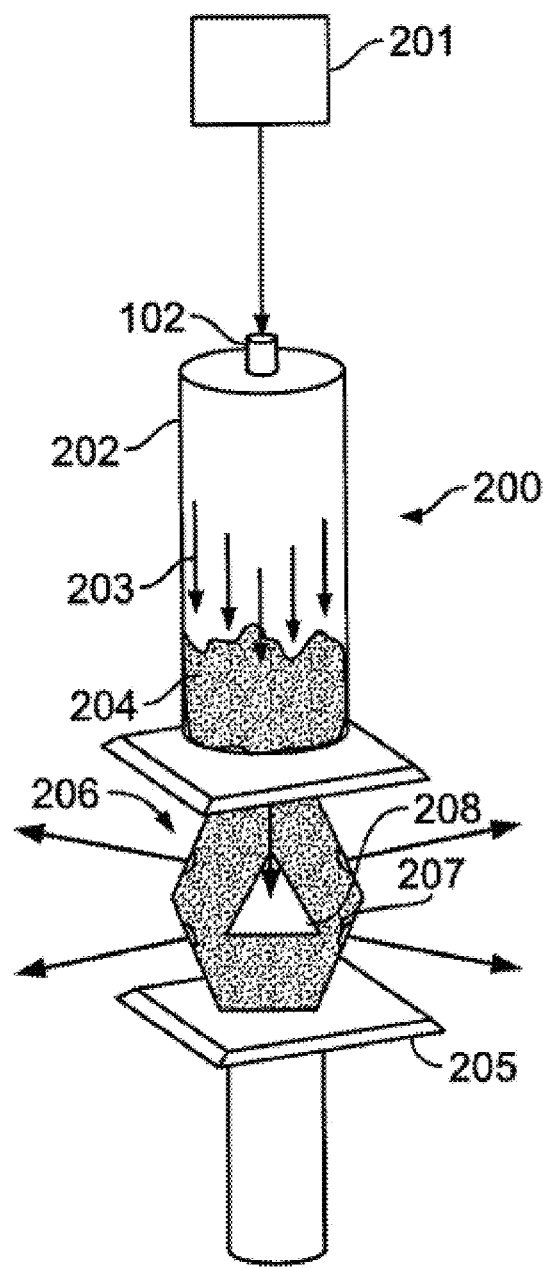
FIG. 3 is a schematic diagram of a further embodiment of a system for mandrel fabrication using a mold injection apparatus and a pressing mechanism.

In a further embodiment, an aggregate mixture can be carried into a mold using a pressurized material injection vessel 200 to inject the material directly into the mold, as shown in FIG. 3. As similarly described above, a mixture 204 of an aggregate material and a binder material is prepared and placed into an aggregate mixture chamber 202. The chamber 202 is connected to a cavity 208 of a mold or tool 206 to allow the contents of the chamber 202 to flow into the mold 206. A volume of air or other fluid 203, from a pressurized source 201, is passed through the aggregate mixture chamber 202, forcing the material 204 out of the chamber 202 and into the mold 206. In a configuration such as shown in FIG. 3, a higher kinetic energy can be imparted to the aggregate mixture by significantly increasing the flow rate of the fluid 203 that is able to enter the aggregate mixture chamber 202. Vents 207 within the mold 206 allow the fluid to exit the mold 206 and flow into the environment after distributing the material throughout the mold cavity 208, while the material 204 remains in the mold cavity 208.

As shown in FIG. 3, a mechanical press 205 can also be applied to the mold 206, which is used to hold pieces of a multi-piece mold together. As also described above, although a vertical press configuration is shown, other types of pressing configurations may be used, including horizontal or isostatic pressing.

Figure 4:
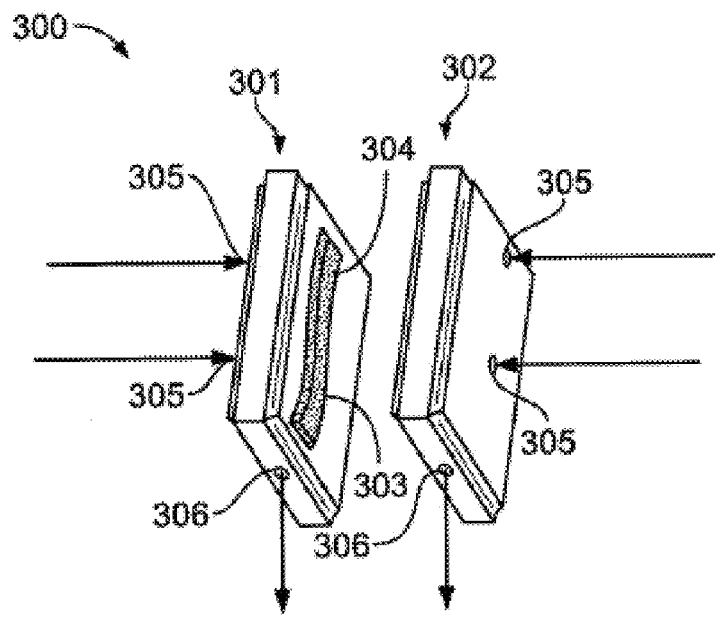
FIG. 4 is a schematic diagram of one embodiment of a mold for use with mandrel forming methods according to the present invention.

Assemblies such as those shown in FIGS. 1-3 can be used as a mandrel making machine capable of mass producing mandrels, which are, in turn, used to produce composite parts. A mixture of sand or other aggregate with a binder is prepared and injected into a mold, such as in a manner described above. The mixture may advantageously be prepared to a consistency that allows the mixture to completely fill the mold without a void. One exemplary mold 300 is shown in FIG. 4. The mold 300 includes two mold halves 301, 302 that are pressed together to form an internal mold cavity 303 for formation of a mandrel 304. Each mold half 301, 302 contains at least one inlet port 305 for injection or inlet of material such as in the manners described above with respect to FIGS. 1-3, and at least one outlet port 306 to allow fluid to escape therefrom after the aggregate mixture is deposited within the mold cavity 303. In the embodiment shown, the mold 300 includes multiple inlet ports 305, which may be provided by a manifold, as described below. It is understood that in some embodiments, only one of the mold halves 301, 302 may contain an inlet port 305 and/or an outlet port 306. It is also understood that a different mold configuration may be used to form a mandrel.

Figure 6:
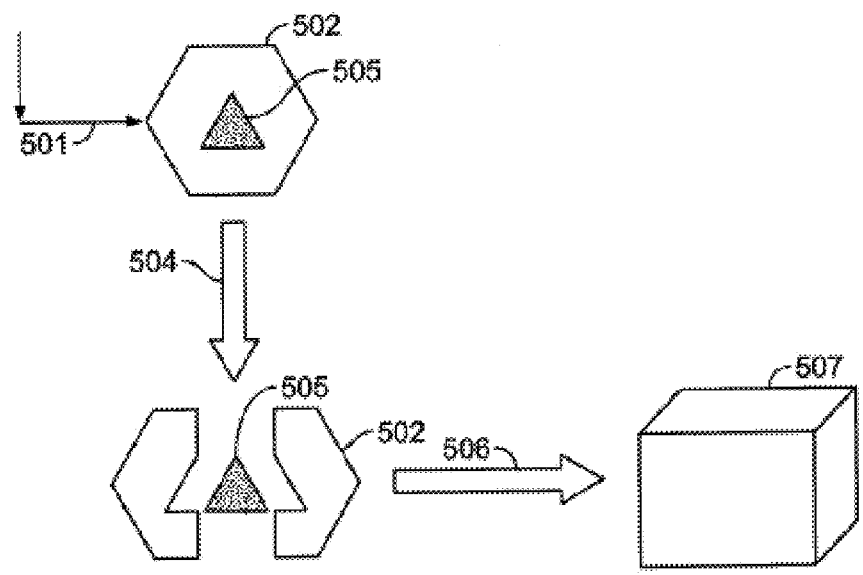
FIG. 6 is a schematic diagram of one embodiment of a multi-step method for drying/curing a binder and aggregate composition.
Figure 8:
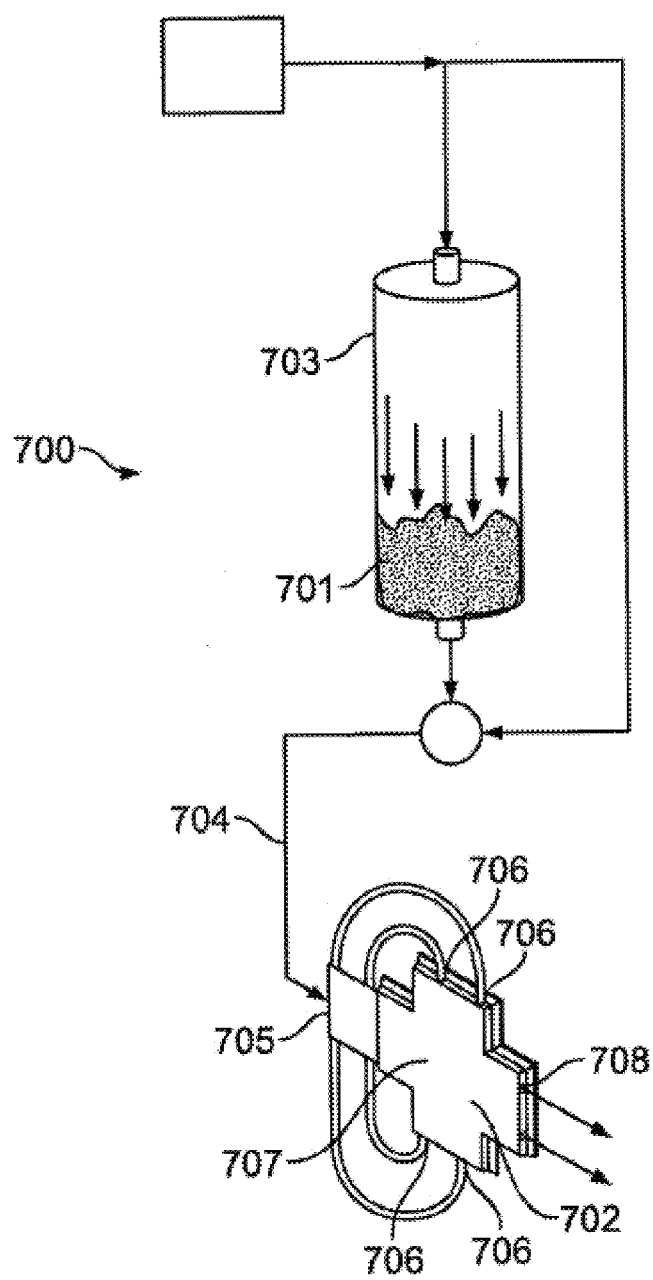
FIG. 8 is a schematic diagram of one embodiment of a system for mandrel fabrication using a pressurized material injection vessel and a distribution manifold.

FIG. 8 illustrates an exemplary embodiment of a system 700 for distribution of the fluidized aggregate mixture 701 into a mold 702 using a pressurized material injection vessel 703 (e.g., a sand blaster), which, in this embodiment, is similar or identical to the injection vessel 100 shown and described in FIG. 1. In the embodiment shown in FIG. 8, the injection vessel 703 has a hose 704 coupled to a manifold 705, and the manifold 705 is coupled to the mold 702 and distributes the flow of the aggregate mixture 701 to provide multiple injection ports 706 for injection of the mixture 701 into the mold cavity 707. The cavity also has outlet ports 708, as depicted in FIG. 6. Further the initial injection vessel 703 may contain multiple output ports so as to supply multiple injection ports 706 in the mold 707.

In different embodiments, the mold may be configured with either horizontal or vertical parting lines. Additionally, in one embodiment, the mold has a single parting line, but in other embodiments, the mold may have multiple parting lines. For example, a mold with multiple vertical parting lines may include multiple injection devices to accelerate the process. Some mandrel shapes, however, may be better suited for production in horizontal parting line molds. For example, horizontal parting line molds may be more suitable when large mandrels are to be produced in one mold, so that the cavity for forming the mandrel extends relatively far from the injection means. Similarly, if several mandrels were to be made simultaneously using a mold with multiple cavities, a horizontal parting line mold may offer better performance.

The mixture is injected into the mandrel form (mold) by an injection means, such as the injection means discussed above. If necessary, water or another liquid may be added to the material such that a desired viscosity is reached for "shooting" the mixture into the mold. The injection means may utilize compressed air, gravity, or any other means capable of mobilizing or fluidizing an aggregate/binder mixture. The injection means may additionally be used to inject the mixture into multiple molds at a time.

Once the mold has been filled with the aggregate/binder mixture, one or more processing methods can be adopted to process the mandrel into a desired state for use in polymer or composite manufacturing. Generally, the filled mold is treated to activate the binder in the mixture or to otherwise harden the mixture such that the mandrel retains its shape upon being removed from the mold. In one exemplary embodiment, the process of treating the mandrel is designed to take a very short period of time, such as on the order of seconds, so that the formed mandrel may be removed from the mold and the mold may be filled again rapidly, facilitating a process capable of being used to mass produce mandrels. In certain embodiments, the entire process of molding the mandrel can take less than two minutes, and in one embodiment, less than one minute. Depending on the composition of the mixture used, and, in particular, the type of binder(s) used, the mandrel may be treated initially by one of a number of methods.

Figure 5:
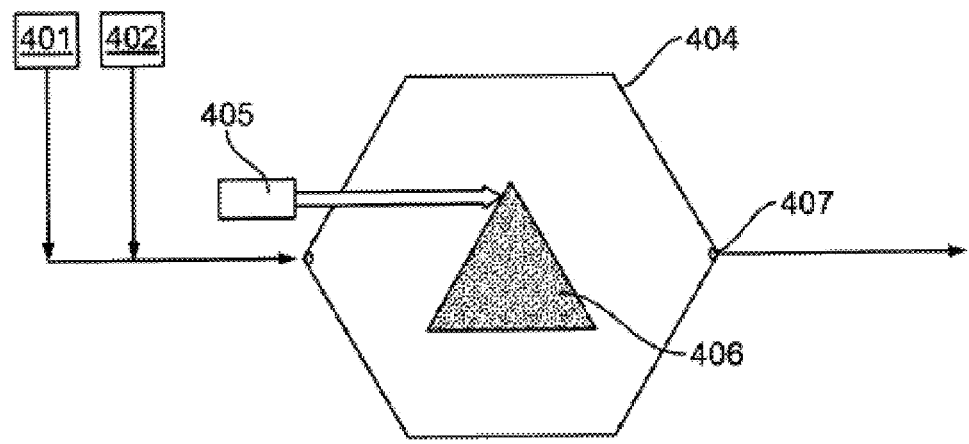
FIG. 5 is a schematic diagram of one embodiment of a method for drying/curing a binder and aggregate composition within a mold.

One embodiment of such a treating method is fluid exchange dehydration, an example of which is illustrated in FIG. 5. As shown in FIG. 5, a drying gas 401, such as air, is passed into the mold 404, where it contacts the moist material forming the green mandrel 406, picks up moisture, and exits through vents 407 in the mold 404. The mold may include one or more inlets and one or more outlets for the stream of gas to pass into and out of the form and may pass over the mandrel in multiple directions to shorten the duration required for treatment. As described above, in one embodiment, the same inlets and outlets used when filling the mold with the aggregate mixture can be used for infiltrating the mold with the drying gas.

In some embodiments, maintaining low water vapor pressure and relatively high temperature in the drying gas stream 401 can increase the rate of removal of water or other liquid. Heating the mandrel 406 through the mold 404, as described in the hot-box techniques below, can also increase the rate of liquid removal. This will further reduce the treating time and curing time of the formed mandrel, and can increase mass production rate. In addition, a vacuum (not shown) can be advantageously applied to exit vents 407, along with any of the above-described configurations. In one embodiment of this technique, a hot gas is heated to about 150° F.-250° F. and passes through the mold for a period of about 30 seconds to two minutes. It is understood that this time may be varied depending upon the temperature of the hot gas, the mixture composition, the size of the mandrel, and the configuration of the mold in allowing hot gas to pass over the mandrel. In another embodiment, a similar drying technique would utilize only bone dry gas or a combination of both dry and hot gas to dry the mandrel through dehydration/evaporation. Materials that can be subjected to dehydration in this manner include inorganic salts (sodium silicate, phosphates, $MgSO_4$ etc) and organic binders (PVP, PVA, protein etc).

In another embodiment, a cold-box or no-bake method, such as a reactive gas curing method, advantageously may be used to treat the green mandrel, wherein the cure of the mandrel can take place without heating the mold. This is typically effected by exposing the mandrel to a curing agent, usually in gaseous form. For example, if the binder is acid curable, a vaporized amine solution or carbon dioxide vapors may be used. The configuration illustrated in FIG. 5 can be used for a reactive gas curing technique as well. In such an embodiment, instead of applying a drying gas to remove water from the mandrel 406, a reactive gas 402 can be introduced into the mold in addition to, or in place of, the drying gas 401. The reactive gas 402 forces a phase change or reaction within the binder of the mandrel, which then produces the desired strength in the mandrel. Depending on the binder and the curing agent, this process typically takes a very short time, and may take less than 30 seconds. In one embodiment, the treating process with a curing agent may be completed in 10 seconds or less. Many different types of binders are usable with reactive curing techniques, including sodium silicate, Isocure™, or any other binder system that undergoes a chemical reaction to reach a hardened or semi-hardened state.

A further embodiment of a treating method that advantageously may be used to cure/strengthen the mandrel is a hot-box method, wherein the mandrel materials are hardened by heating the mold. This effectively removes liquid (such as water) from the formed mandrel and hardens certain binder materials, including many water-soluble binders and non-water-soluble binders. One such means of heating the mandrel 406 is application of internal microwave energy 405 or other heating energy within the mold 404, as illustrated in FIG. 5. Accordingly, in one embodiment, the mold 404 may be constructed of materials that allow the mandrel 406 to be exposed to microwave energy 405 while still in the mold, such as PVP or PVA or other dehydration strengthening binders combined with a porous aggregate. The heating treatment generally takes place at least long enough for the mandrel to achieve sufficient green strength to enable handling without damage to the mandrel or its shape. This can take anywhere from several seconds to minutes. If the mandrel is not fully dried before removal from the form, further drying of the mandrel, which may be required before lay-up of composite fiber and resin, can take place over time during storage or shipment, as described below. For this method of treating, it may be advantageous for the mold to comprise a material with a high thermal conductivity, such as steel, aluminum, Invar, etc.

Certain mixtures may have sufficient green strength to be removed from the mold almost immediately after loading or after a very short treatment under one of the methods listed above. The curing process for these mandrels may continue as the mandrels dry in storage or shipment, as described above, or the curing process may be further effected by some other means. For instance, curing may be completed by exposing the mandrel to a curing agent, baking the mandrel in an oven, or irradiating with microwave energy. This secondary treating process may further enhance the overall efficiency of the mandrel production process.

One example of such a two step curing process is shown in FIG. 6. An initial strengthening technique 501 is used to impart the mandrel 505 with sufficient strength to be removed from the mold 502. The hot gas drying, hot-box, or cold-box reactive curing techniques described above can be used, for example, as the initial strengthening technique 501. After the initial strengthening, when the mandrel material has reached sufficient strength for handling, the partially-hardened or partially-cured mandrel 505 is removed 504 from the mold 502 and placed 506 into a secondary treatment process 507 for further strengthening. Such a secondary treatment process 507 may include, without limitation, convection oven heating, exposure to electromagnetic waves (such as microwave heating), chemical reaction, exposure to another energy source not listed above, placing in a vacuum chamber, placing in a dry environment, placing in a shipping container with or without a desiccant, or any mixture of such techniques.

For example, in one exemplary embodiment, the mandrel material mixture contains a primary binder that provides good strength and desirable properties and a secondary binder that strengthens quickly to permit removal of the mandrel from the tooling before the primary binder is hardened. As described above, the primary binder can be hardened after removal, leaving the mold free for production of additional mandrels, increasing production rate. In one embodiment, the mixture includes a primary binder that is water-soluble and environmentally benign, such as polyvinyl pyrrolidone (PVP), and an additive that may be treated with a gas, such as sodium silicate, also called water glass. Uncured PVP has very little green strength and is generally cured by a hot-box process which requires that the mandrel remain in the mold during this process. The water glass component of the binder, however, may be quickly fixed by passing carbon dioxide ($CO_2$) or any other slightly acidic gas through the mold for only a few seconds, after which the mandrel retains sufficient strength to allow handling. In this manner, the mandrel may be removed from the mold and cured using microwave energy. The microwave energy cures the mandrel in only a few seconds, after which the dry strength of the PVP provides a durable mandrel that is relatively lightweight and water-soluble.

A mandrel mixture composition according to the present invention may typically include sand and/or other aggregate(s), a binder or combination of binders, and possibly additional additives to improve the characteristics of the mandrel in a particular application. In many embodiments, the water soluble binder/aggregate mixtures have binder concentrations that range from less than 0.5% binder to weight of aggregate to over 50%. The amount of binder utilized can be determined by the desired ultimate strength and drying time. Additionally, in some embodiments, water content in the binder/aggregate mixture is kept to a minimum, in order to facilitate drying/strengthening of the mandrel. For example, water contents of less than 10% are typical of some embodiments. Further, in some embodiments, it is preferable for the aggregate and binder mixture used to produce the mandrel to possess a porosity greater than about 20%. Too low a porosity within the uncured mandrel material can lead to the formation of steam pockets within the mandrel that can produce pathways in the mandrel or even complete deformation.

Various different aggregates, or combinations thereof, may be used in different embodiments of the binder/aggregate mixture. Sand is one suitable choice for the aggregate component of the mixture because of its availability. However, other aggregates may be chosen for various reasons, such as their compatibility with a particular binder, their consistency, or their capacity to undergo a reclamation process after being removed from the finished composite structure. Examples of other particulate materials which may be employed as aggregates or as additives include glass or polymer microspheres, pumice, graphite or coke particles, small steel shot, glass beads or bubbles, small polypropylene pellets, alumina, cenospheres, and clays. A combination of two or more of these materials may also be used. Particle size is often directly related to surface quality, aggregate density, and packing density, and in one embodiment, particle sizes of between about 100 microns and about 300 microns are utilized. The resultant aggregate density can vary from about 0.4 to about 2 g/ml, in one embodiment. Higher aggregate densities can results in higher compaction, but may not be ideal for some applications, since particle size also plays an important role. Other density considerations may include mandrel geometry, since higher density aggregates can result in higher stresses being exerted on the mandrel.

A binder or combination of binders can be chosen based on a number of factors, including the duration of time required to treat the mandrel until it reaches a level of hardness to allow handling, the tensile strength of the binder in connection with the chosen aggregate when fully cured, the cost of the binder, the viscosity of the mixture when the binder and aggregate are combined, the water-solubility of the binder, and the environmental byproducts of the curing and removal processes. Ultimately, the proper binder can be determined with reference to the specific properties necessary for the finished composite part. Certain mixtures of salts and aggregate produce a fairly weak and brittle mandrel that is not readily usable in most composite preparation techniques, but will withstand the conditions necessary for a wet lay-up of composite material. Such a low strength salt mandrel can be prepared quickly and inexpensively using currently available binders and machinery. Tensile strengths for this type of mandrel are usually on the order of 100 PSI. These binders include, but are not limited to, $MgSO_4$, phosphates, sodium silicate, etc.

Other applications may be better suited to different binder systems. For example, in more demanding applications and in mandrels that may require secondary machining after fabrication, a range of hybrid systems may be used for manufacturing the mandrel, including, but not limited to, combinations of organic and inorganic binders. As described above, in one exemplary embodiment, a water-soluble hybrid binder composition includes sodium silicate and PVP. For example, such compositions can range from about 1-20% weight sodium silicate and about 1-30% weight PVP, in various embodiments with the remained being comprised of aggregate and/or additive. Specific binder compositions and ratios may vary, dependent on factors such as the aggregate type and size and the effective surface area of the binder. In many embodiments of hybrid compositions, the organic component affords a mandrel with better machinability, which also is capable of attaining higher strengths for demanding applications. PVP is one such suitable organic binder, due to properties such as water-solubility, low viscosity, high tensile strength, and environmentally benign nature. Many other water-soluble binders may be used with other embodiments, including but not limited to various salts (including sodium silicate), phosphates, gelatins, water-soluble hemicellulose, water-soluble polymers, and poly vinyl alcohol. Other non-water-soluble materials may also be appropriate as binder materials, including phenolics and many organic polymers.

Various specific compositions have been found to have advantageous properties when used in connection with the production methods described herein. One exemplary binder/aggregate composition includes about 3-10% PVP, about 3-10% liquid sodium silicate, (40 baum), about 7-17% water, and about 70-77% cenospheres. This composition produces a high strength, acid gas-curable mandrel material having good green strength with average coefficient of thermal expansion (CTE) less than 10 ppm. Additionally, the mandrels resulting from this composition generally have good surface finish and water solubility. Another exemplary composition includes about 3% PVP, about 17% water, and about 80% cenospheres. This composition must be dried to gain green strength and has similar CTE values to the immediately preceding composition. Additionally, the mandrels resulting from this composition generally have good surface finish and are highly water soluble. A further exemplary composition includes about 20% sodium silicate (40 baum) and about 80% cenospheres. This composition is a very fast acid gas-curable composition, and is water-insoluble at room temperature. It also produces mandrels with good surface finish.

Additives may be used to enhance the performance of the mandrel and materials in any of the above embodiments. Such materials include alkaline hydroxides, e.g., NaOH, water and various organic and inorganic additives. Less than 1% additives is necessary in many exemplary compositions. Minor amounts of other additives, such as surfactants, may be present. The surfactants may be anionic, nonionic, cationic, amphoretic or mixtures thereof. Examples of water soluble surfactants are anionic surfactants selected from organic sulphates, organic sulphonates and organic phosphate esters, e.g., potassium 2-ethylhexyl phosphate. Certain surfactants also operate as flow control agents. Other additives include humidity resistant additives, collapsibility (or breakdown) enhancers, preservatives, dyes, bulking agents, hot strength additives, or flow enhancers. Humidity resistant additives include, for example, potassium tetraborate, zinc carbonate, zinc oxide. Collapsibility (or breakdown) enhancers include, for example, sugar, e.g., sucrose, dextrin and sawdust. Refractory coatings, such as silica in a solvent, may be used to impart a finished surface to the mandrel. Of course, the additives may be added in combination or singly.

Preservatives may be added to prevent mold and spoilage of the binders during storage. Amounts of such preservatives will vary depending upon the preservative employed, but generally, amounts up to about 1 percent by weight are considered sufficient. In one embodiment, sodium benzoate is used as a preservative, and is typically utilized in an amount of about 0.2 percent based upon the weight of the binder. Essentially any preservative which is compatible with the binder and various other additives and which is environmentally safe can be used in the present invention.

After treating and removing from the mold, a mandrel may require machining or other processing to form the desired shape. Depending on materials used and their cure, further curing may be required prior to machining the mandrel The invention further relates to methods for manufacture of composite or polymer parts or components, including complex parts such as ductwork which provides a passageway for channeling air, gases, fluids, wiring or the like. The type of composite or polymer product is, however, not a limiting feature of the invention. One aspect of the invention is the ability to manufacture composite parts at efficient rates, so that the parts can be effectively mass produced in an economic manner. In general, polymer or composite materials (including precursor materials) are placed into contact with the mandrel in order to impart the shape of the mandrel to the final polymer or composite product. One such production method involves wrapping the mandrel with materials to produce the final product. The mandrel can also be used for a range of other known processing techniques like plastic injection, RTM, VRTM, etc.

By way of example, in producing a composite product, a preformed mandrel of the type described above may be wrapped with or otherwise coated with a polymer or composite material (which may include precursor materials). The coated material may then be cured by heating, exposing to light energy, etc. Techniques for curing such polymer or composite materials are known in the art, and vary by the type and nature of materials used. Then the mandrel may be removed, for example by solubilizing in water, to open a formed passageway in the formed part. The mandrel, having been formed by efficient production speed techniques coupled with its use as a means to form the internal configuration of composites which are processable at efficient production speed levels enables the economic production of polymer or composite parts. The production efficiency can be further enhanced by the ability to remove the mandrel material from the composite part quickly, efficiently and without damage to the formed composite, such as through the use of water-soluble binders. Making the mandrels and using them with composites thus enables economic manufacture of complex composite and polymer parts, particularly those having complex internal hollows, chambers and passageways. For example, components such airducts and hollow structural components such as air frames, bikes and bike frames, car frames, and plane hulls can be manufactured using composite materials using the mandrels and methods described herein. Parts may be produced using the principles described herein for use in motor vehicles, boats, bicycles and other transportation vehicles, as well as other structures for various other industries. Examples of composite materials that can be used in accordance with embodiments of the invention include epoxy- or phenolic-based polymer binders impregnated into different fiber systems, such as fiberglass, Kevlar, carbon, etc. It is understood that these examples of components and materials are not exhaustive, and that a wide variety of components and materials can be manufactured.

Figure 7:
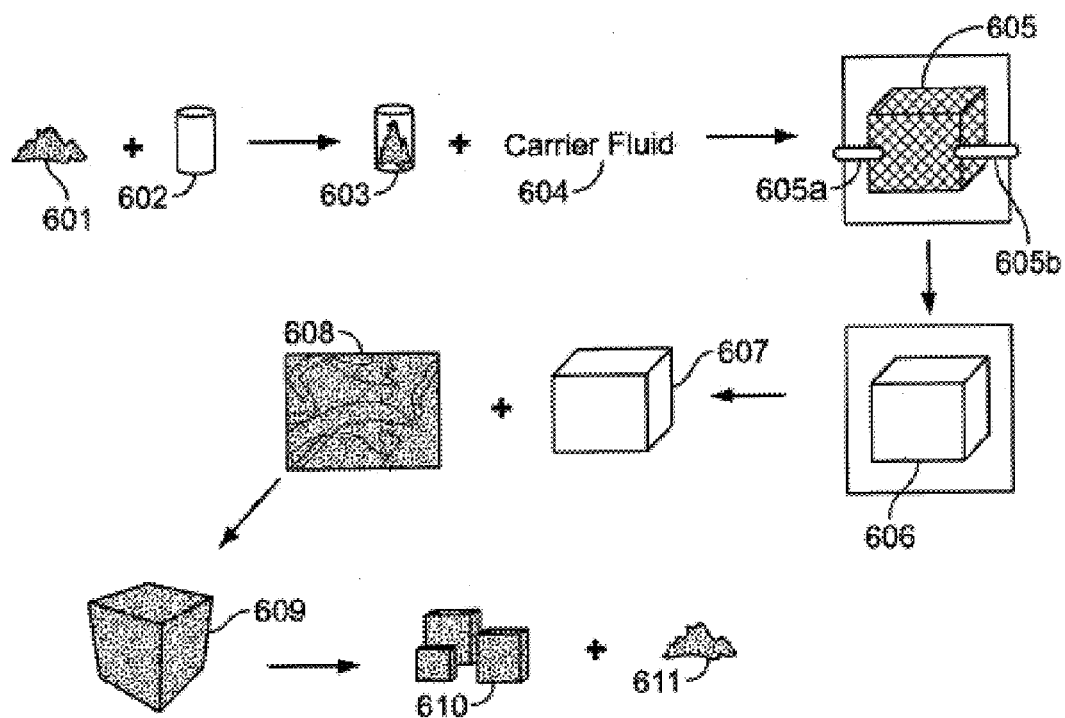
FIG. 7 is a schematic diagram of one embodiment of a method for production of a composite part according to the present invention.

FIG. 7 illustrates one exemplary embodiment of a production method 600 according to principles of the invention. The aggregate material(s) 601 are first mixed with binder material(s) 602, as well as potentially other additives, to form the binder/aggregate mixture 603. This mixture is then placed in a fluidized state by imparting the mixture in a carrier fluid 604. Once in the fluidized state, the mixture 603 and carrier fluid 604 are propelled via a pressure gradient into a mold 605 with a vented cavity. The material 603 enters the cavity through a fill port 605a and is separated from the carrier fluid 605 using a screen or filter at the dedicated vents 605b. After the cavity is filled with the material 603 to form the green mandrel 607, additional processing 606 is performed to facilitate removal of the mandrel 607 from the mold 605. As described above, this can accomplished in a variety of ways, ranging from complete curing within the mold or initial curing and removal for post drying/curing. Curing within the mold can be accomplished through techniques described above, such as removal of water (via heat, air, vacuum, microwave, etc.) or chemical reaction (crosslinking, precipitation, polymerization, etc.). Multi-step curing processes described above can also be used, where the mandrel 607 can initially be cured enough to gain partial strength for removal, forming a partially-cured or partially-hardened mandrel, and the partially-hardened mandrel can then be post-cured using any of the above techniques. The initial curing and removal can allow the mandrel to be removed and the mold recovered more quickly for continued processing.

After the mandrel 607 has been fully cured, it can then be used for producing a finished composite or polymer part. A release layer may be applied to the mandrel before part production, such as in the form of a sealer, which stops the resin/polymer systems of the composite or polymer product from penetrating the mandrel material. In the above illustration, the mandrel is covered with a polymer-impregnated fiber 608 to create a composite form 609 of the desired shape. Once in the desired shape, depending on the utilized resin/polymer system, the part may be cured, for example by using techniques such as vacuum, heat, UV, and chemical means. After reaching the desired cure state, the composite part 610 is then ready for mandrel removal. The part can be cured using any known technique, depending on the material, including without limitation application of heat, application of pressure, application of light or other electromagnetic wave, chemical reaction, exposure to another type of energy source other than the above, placing in a vacuum chamber, placing in a dry environment, or any combination of said techniques. The mandrel can be removed using a range of techniques from mechanical agitation to water dissolution, depending on the binder/aggregate composition. In one embodiment, where the mandrel 607 includes a water soluble binder composition, the mandrel is solubilized by application of water thereto, which breaks up the mandrel 607 and washes away the insoluble components of the mandrel, without damaging the produced article. The final product is a finished composite part 610 and the removed mandrel materials 611. In one embodiment, the aggregate and water may be reclaimed upon removal of the mandrel from the finished composite structure.

The invention further relates to methods for removing a mandrel from a finished composite part after the product has been molded and cured. Where a water-soluble binder is used, mandrels may be removed from a finished composite structure by exposing the binder and aggregate particles to an effective amount of water to dissolve the binder and disintegrate the mandrel, and then removing the aggregate particles from the cavity of the molded product. The environmental impact of water-soluble binders may be considered in choosing a method for removing the binder material, as not all of the byproducts of water-soluble binders are environmentally benign.

In one embodiment, the water may be sprayed into the structure at high pressure to remove the mandrel material more quickly. Alternatively, the water may be heated to a temperature below boiling which may dissolve particular binders more quickly. Yet another alternative would be to jet a stream of water into the finished composite structure to break the bonds of the water-soluble binder, and then removing any remaining mandrel material either with water directly or by mechanical agitation. Each of these methods can be performed in less than 30 minutes for most mandrels, and many mandrels may be fully removed in less than one minute.

With certain binders, the rate at which the bonded sand mandrel is weakened by exposure to water may be accelerated by pretreatment of the sand mandrel. In some exemplary embodiments, this pretreatment involves immersing the sand mandrel in a dilute alkaline solution or hot water for from one to ten minutes, drawing the alkaline solution or water through the mandrel, and/or blowing steam through the mandrel. The alkaline treatment is particularly suitable for composite materials which are not affected by alkali. Examples of useful solutions for this method include dilute alkaline solutions of sodium hydroxide, potassium hydroxide or sodium carbonate, which are relatively benign and relatively inexpensive.

Mechanical agitation also may be used to remove the mandrel from the composite structure. In one embodiment, the mandrel may first be conditioned by steam, water, or some other removal agent to initially break at least some of the bonds of the mandrel. A mechanical means may additionally or alternately be provided to break the mandrel into pieces while within the composite structure. Once the mandrel has been weakened by chemical or mechanical means, the finished composite structure is agitated by shaking or some other method to remove the rest of the mandrel material. This is a typical method of removal for most non-water-soluble binders, including various organic compounds and phenolics.

The invention also relates to mandrels produced using the above materials, methods, and machines. In one embodiment, a mandrel produced as described above includes a water-soluble organic or inorganic binder, or a combination of organic and inorganic binders, and one or more aggregate materials, such as sand, ceramic spheres, etc., as described above. It is understood that various embodiments of the mandrels described herein may contain any of the materials and additives described above for use in manufacturing the mandrels. Additionally, the mandrels manufactured as described herein can be used for the methods of forming composites described herein.

In some applications, a mandrel with a minimal amount of expansion during heating, i.e. a low CTE, can be desireable. In other applications, a mandrel that can expand can be useful. In an embodiment, the mandrel can be used to compress a composite material into a composite structure having a desired shape, and then can be easily removed to provide the final composite structure. Because the mandrel can be used to form a hollow composite structure, with no residual material left within the composite structure, the mandrel allows for the construction of composite materials in specific configurations with no additional weight or material left in the composite. This lack of weight is particularly advantageous in applications where every reduction in weight can be advantageous, such as for example, high performance materials in automotive and aircraft parts. Similarly, the construction of a hollow structure with no residual material on the interior can produce structures in which the inside can be used as a channel, tube, passageway, or pass-through for materials, gases, fluids, wires, rods, and other items or materials.

In an embodiment of the disclosure, the mandrel can be composed of an expandable material and a binder. The mandrel can also be composed additionally of a filler. An expandable material can be any material that expands when activated by an energy source. In an embodiment, the expandable material can be a material that expands when activated with heat. Alternatively, the expandable material can be a material that expands when activated with another energy source such as for example an energy wave such as a sound or acoustic wave or a microwave. Preferably the expandable material can be a material that expands when activated with heat or thermal energy.

In an embodiment, the expandable material is a particle or substance that can be included in the binder. The expandable material can be an organic or an inorganic material that is capable of expanding in response to the activating source. In one exemplary embodiment, the expandable material can be an organic material such as an organic polymer particle capable of expanding. The organic polymer particle can be a thermoplastic polymer that undergoes expansion, such as for example, expandable microspheres sold by Kureha or Akzo Nobel under the brand names Kureha Microspheres or Expancel™, or as disclosed in for example, U.S. Pat. Nos. 4,430,450, 4,4333,029, and 5,977,195. For example, a thermally expanding thermoplastic sphere that contains a distillate which can apply a internal pressure to the thermoplastic when heated, forcing the thermoplastic material to expand against its surroundings, resulting in a net expansion of the mandrel. The net expansion of the mandrel can create a pressure and/or compression on a composite material on the outside of the mandrel. In another exemplary embodiment, the expandable material can be expandable graphite. Expandable graphite or expandable flake graphite is also known as intumescent flake graphite, or simply "expandable flake." Expandable flake graphite is a form of intercalated graphite having an intercallant that causes the graphite to exfoliate when treated with an energy source, such as for example heat. The exfoliation causes the graphite to expand, increasing the net expansion of the mandrel.

Several different grades and types of expandable material can be selected, based on type or category, to achieve several tailorable characteristics, particularly an expansion ratio and a expansion temperature. An expansion ratio can be generally defined as the approximate volume increase that the expandable material undergoes in response to its activation, for example, heat. The expandable material can also be selected based on a desired expansion temperature. For example, for composite materials that are thermoset composites, a mandrel can be created that expands at temperatures of about 200 to about 350° F., and an organic polymer particle can be used. Alternative, the mandrel can be created that expands at temperatures higher then 350° F. using an expandable flake graphite, such as might be applied when creating a composite structure using a thermoplastic composite.

Because the mandrel can contain a expandable material, the mandrel can also be described in an embodiment as a self-expanding mandrel. The phrase self expanding mandrel can mean a mandrel that expands due to materials contained within the mandrel, in contrast to mandrels known in the art that expand by virtue of a physical force such as a screw, crank or actuator, or due to physical pressure from for example a bladder. The self-expanding mandrel expands on its own due to the effect of the material within it when subjected to the activating source, for example, heat.

In an embodiment of the disclosure, the mandrel can be composed of a binder that binds the material, including the expandable material, to form the mandrel. The binder can be any binder known to one of skill in the art. In an embodiment, the binder can be an organic binder, such as an organic polymer, a water soluble organic polymer, or water soluble organic macromolecule. In an embodiment, the binder can be an inorganic binder. Non-limiting examples can include water soluble polymers such as poly(2-ethyl-2-oxazoline), polyvinyl alcohols, PVP, gelatins, water soluble hemicelluloses, long alkyl chain organic salts, inorganic salts, silicates, phosphates, and so forth. More than one binder can be included in the mandrel, including more than one organic binder, more than one inorganic binder or a combination of one or more organic and one or more inorganic binders.

In an exemplary embodiment of the disclosure, the binder can be a water soluble binder. The phrase "water soluble binder" can describe a binder that one of ordinary skill in the art would know to dissolve in water. The water soluble binder can be very soluble in water or only partially soluble in water. Washing the mandrel with water can lead to the complete removal of the water soluble binder and the other components of the mandrel from the composite structure. When the binder dissolves, the remaining materials in the mandrel no longer remain in place and can be washed out of the mandrel. By way of example, a mandrel can be created using a water soluble binder, a filler material and an expandable material. After heating to expand the mandrel via to the expandable material, the mandrel can be washed with water dissolving the water soluble binder, and as a result rinsing away the filler and the expandable material. Because the mandrel contains a water soluble binder that allows for removal of the mandrel from a composite structure, the mandrel be described in an embodiment as a water soluble mandrel.

In an embodiment, the mandrel can also optionally contain a filler material. The filler material can be any filler known to one of ordinary skill in the art as a material for preparing a mandrel. The filler can be a low density aggregate material, including but not limited to plaster of paris, sand, silica, carbon, fly ash, fly-ash components, hollow-spheres, talcum, calcium carbonate, fumed silica, sodium chloride, or aluminum tri-hydrate etc.

With the mandrel described above, the material and process disclosed herein can suggest the utilization of a hybrid technology that can capture several advantages of the prior technologies, including the expansion of the bladder, the rigidity of the plaster mandrel, and the water removal of the water soluble mandrel. The disclosed water soluble tooling material therefore resolves several challenges present in the prior art. The utilization of an expanding water soluble mandrel can eliminate the issues with multiple consolidation around a complex mandrel. In addition alternative curing situation requires pressure to be added to a cure that the new material will allow in user specified locations. Removable cores are useful in an array of industries including composites and plastic molding. In addition a non-soluble expansion material is proposed that is capable of application of pressure in curing areas that don't require water removal.

In its simplest form the water soluble self-expanding mandrels are comprised of two to three components; a water soluble thermoplastic binder, a particulate filler material and a expanding media capable of activating through a controllable mechanism, (such as heat, energy, or reaction) to apply pressure to the surrounding components through self expansion.

Figure 9A:
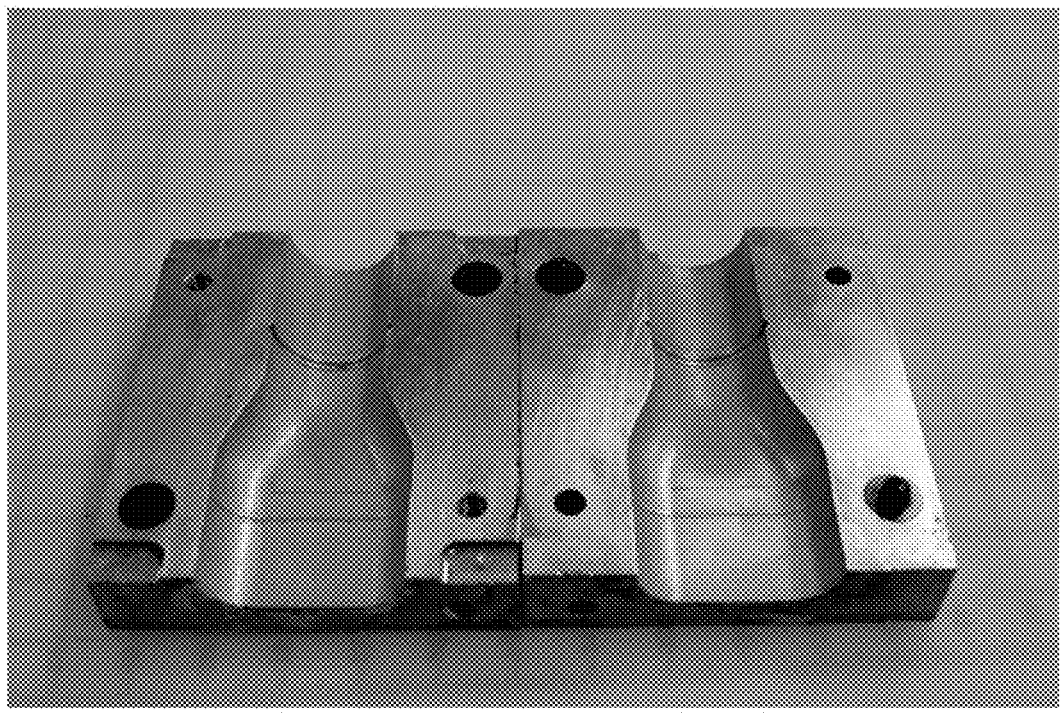
FIG. 9A-9J are photos of exemplary embodiments of a mandrel and a process according to the present disclosure.
Figure 9B:
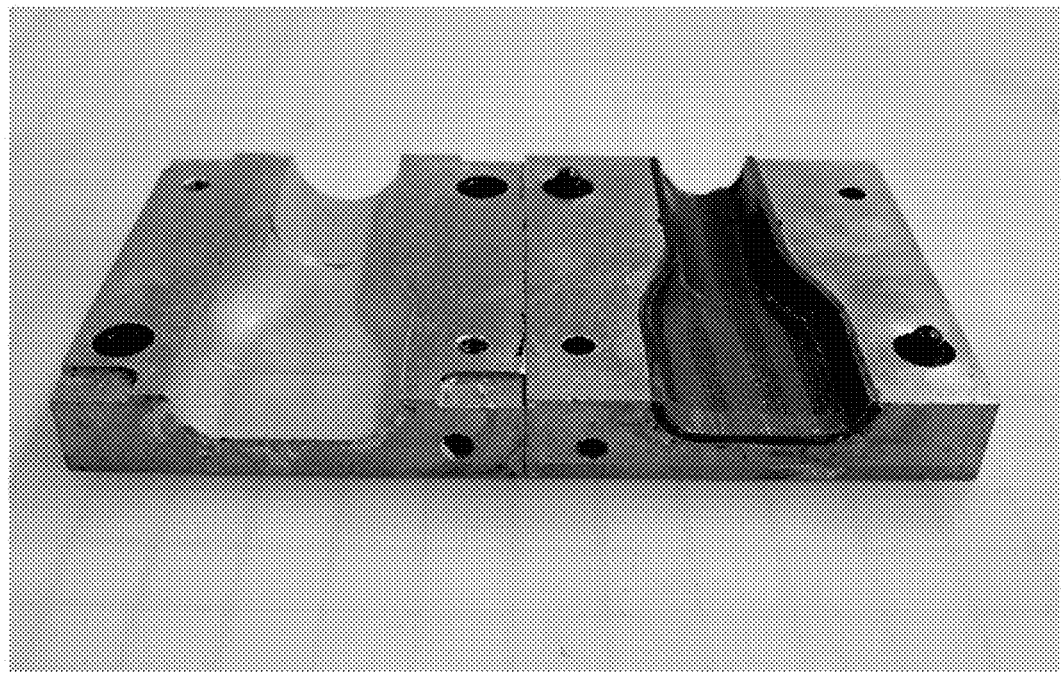
Figure 9C:
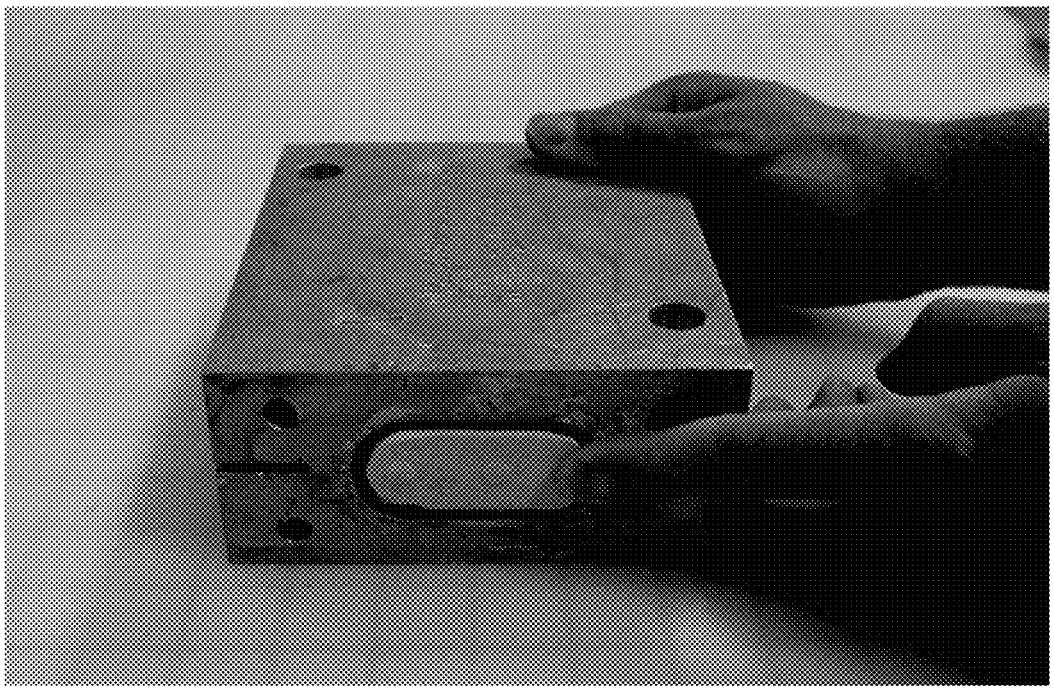

Using the mandrel set forth above, exemplary embodiments of this disclosure can be described more fully in the steps of various processes that can be used to prepare mandrels and composite structures. A composite structure can be prepared by initially creating a tool or mold that has inner dimensions that correspond to the desired outer dimensions of composite structure. An exemplary non-limiting tool is shown in FIG. 9A. The tool or mold can be used to create the mandrel by mixing the desired components of the mandrel and adding the mixture to the tool, then curing the mandrel using standard methods. The mandrel can be cast directly into the tool, particularly if the mandrel components are selected to contract upon curing to produce a mandrel of smaller dimensions than the inner dimensions of the tool. Alternatively, an offset can be placed within the tool prior to adding the mandrel components, as shown in FIG. 9B, allowing the mandrel components to cure and produce a mandrel with dimensions that are approximately uniformly smaller than the tool, as shown in FIG. 9C. The offset can be any material used by one of ordinary skill in a tool, and can include for example a fabric or other rapid prototyped offset of specified dimension. The offset material can be selected to give a mandrel with designable reduced dimensions that are smaller than the tool or mold. The size of the offset, the amount of expansion of an expandable mandrel, and the compressibility of the composite components can each factor into and be tailored to determine the thickness and density of the final composite structure, as further explained below.

The tool or mold can be created in any designable shape, such as a shape created from a CAD model. The final inner dimensions of the tool can be tailored to determine the shape and surface of the outer portions of the final composite structure.

Figure 9D:
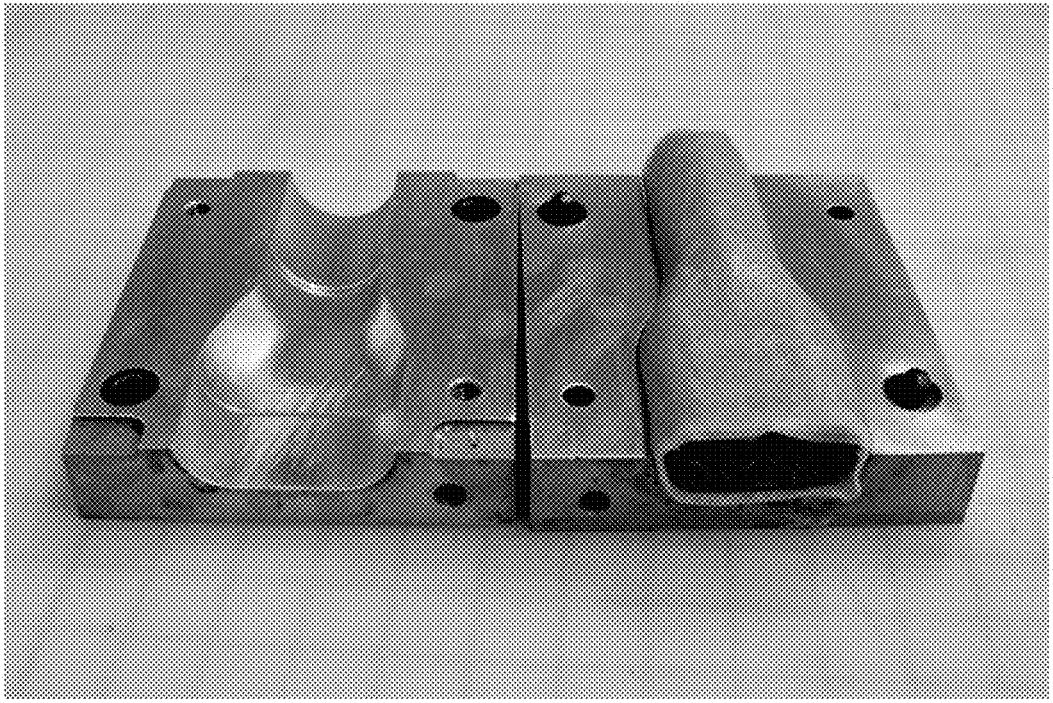

The mandrel can be coated with a composite material and placed within the tool, as shown in FIG. 9D. The mandrel can optionally be covered with a sealer prior to coating with the composite material in order to limit mixing or penetration of the composite material and the mandrel. The composite material can be any material used to make a composite structure. For example, the composite material can include a thermosetting compound, including a thermosetting resin; a thermoplastic compound, including a thermoplastic resin; or one or more layers of carbon fiber mesh. The composite material can also be more than one type of composite, and can be mixed together or layered on the mandrel. An advantage of the disclosed process is that the mandrel, as it expands, can compress separate composite layers together during a curing step. Any material that can be formed in a tool or mold can be used in conjunction with the disclosed system.

Figure 9E:
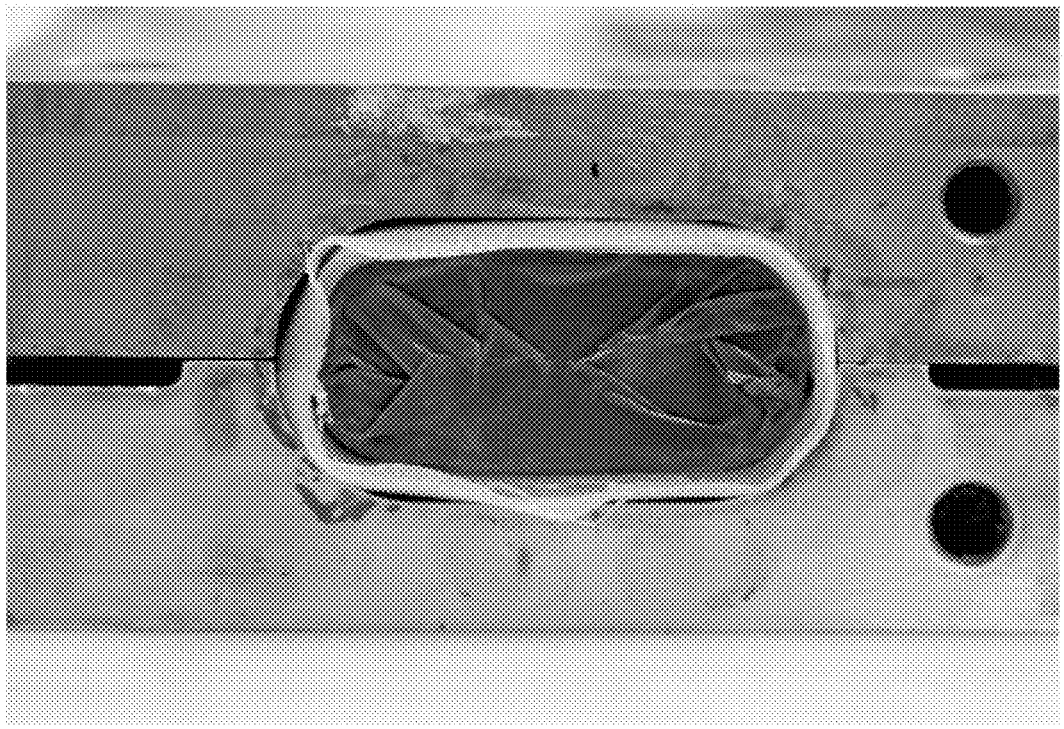
Figure 9F:
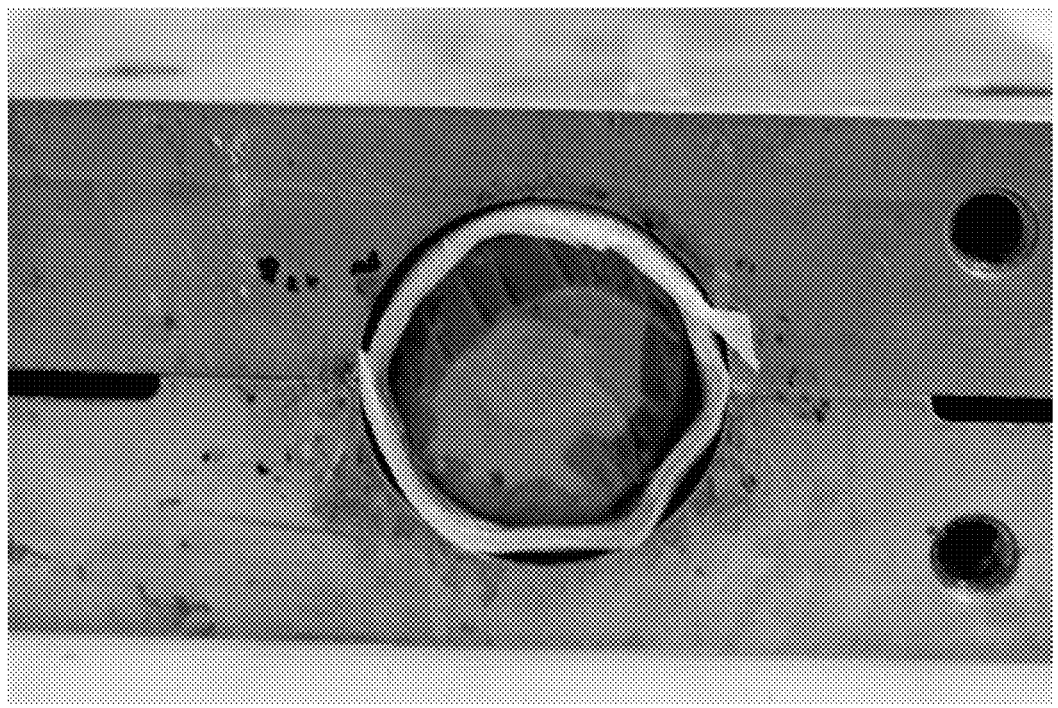

The mandrel and composite material can be enclosed within the tool or mold as shown in FIG. 9E and FIG. 9F, and heated to a desired temperature. During heating the expandable material in the mandrel can expand and can compress and/or hold the composite material against the inner surface of the mold, allowing the material to cure to form the composite structure. The temperature for heating can be any temperature that can cause expansion of the expandable material and that can cause the composite material to form the composite structure. The temperature can be at least 150° F., or at least about 200° F. The temperature can be from about 150° F. to about 700° F., or from about 200° F. to about 650° F. In an embodiment, the temperature can be between about 200° F. and about 350° F., from about 250° F. to about 380° F., or from about 350° F. to about 650° F. The choice of temperature can be varied based on the type of expandable material being used and the type of composite material being used. For example, a thermosetting resin for the composite material might be heated to up to about 350° F. A thermoplastic resin in the composite material might be heated to a temperature higher than 350° F. A mandrel containing an expandable thermoplastic particle would typically be heated to up to about 350° F., but at temperatures higher the 400° F., the thermoplastic expandable particles begin to cross transition temperatures that cause the particle to lose its shape and ability to expand and remain expanded. Above temperatures of 350° F., an expandable graphite can be used. Expandable graphite can also be used at temperatures below 350° F. in certain applications, but the rate of and ratio of expansion at lower temperatures is not as useful compared to higher temperatures for expandable graphite, where the rates and ratios can be more effective.

Figure 9G:
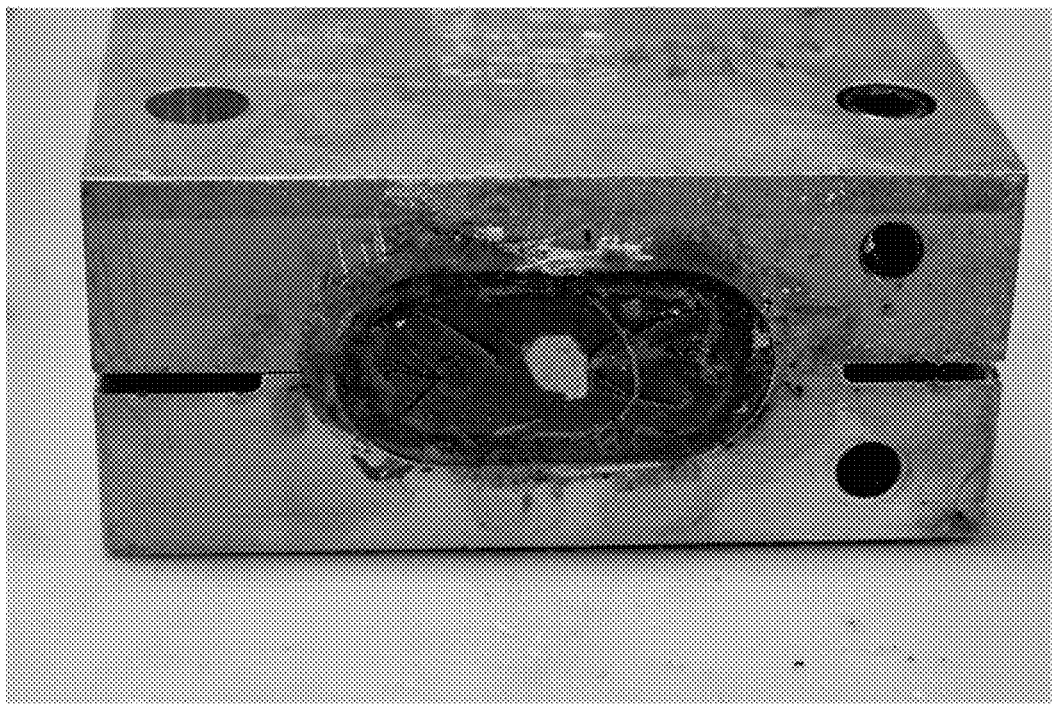
Figure 9H:
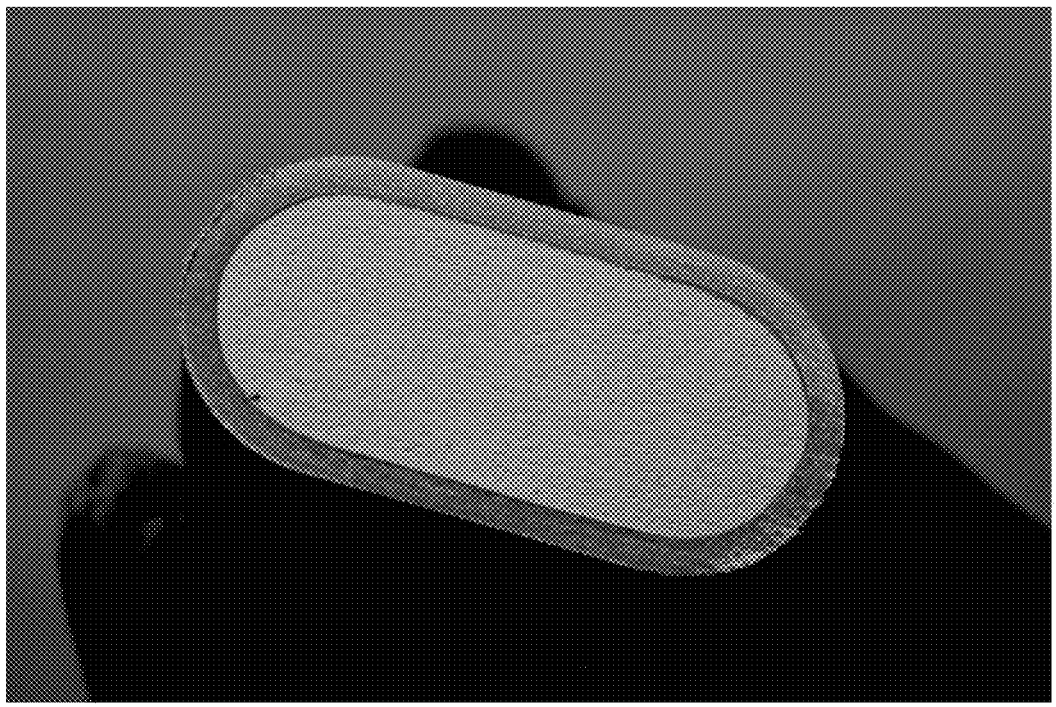
Figure 9I:
Figure 9J:
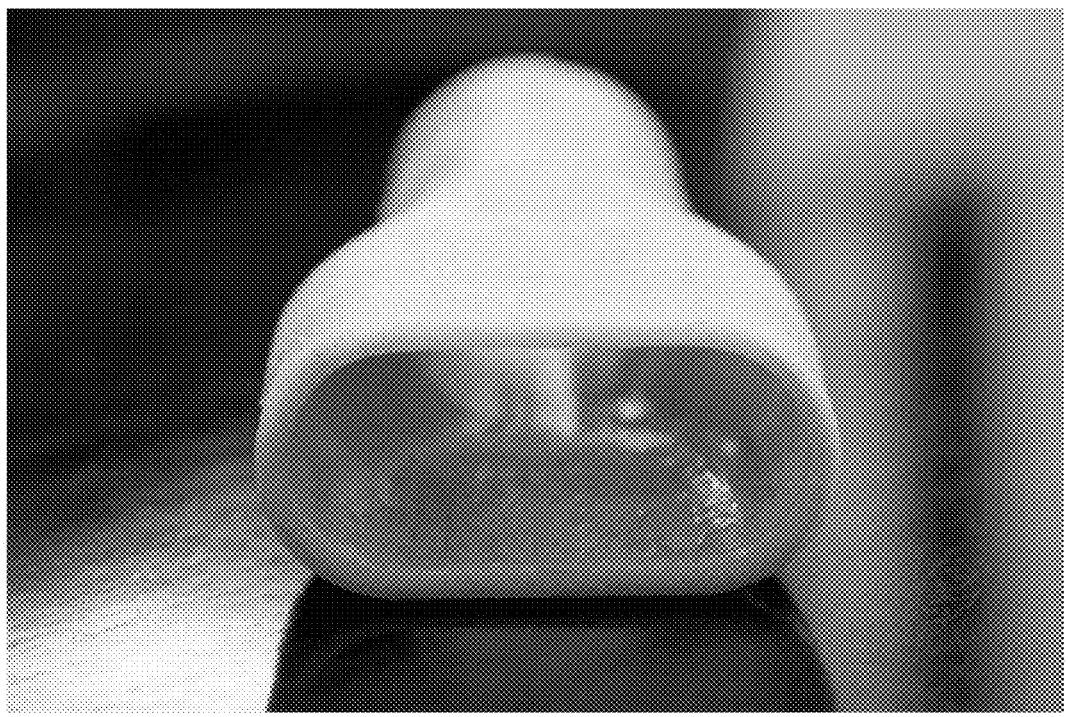

Once heating is complete, the tool, mandrel and composite structure can be removed from the oven or furnace, as shown in FIG. 9G, and cooled. The ends of the composite structure and mandrel can be trimmed on the ends, as shown in FIG. 9H. The mandrel and composite structure can be removed from the tool or mold and rinsed with water to remove the mandrel, as shown in FIG. 9I. Because the mandrel can be prepared with one or more water soluble binders, the mandrel can be rinsed out of the composite structure using any water source, including common tap water. An example of a final composite structure, free of the mandrel, is shown in FIG. 9J.

Several processes and/or subprocesses can be described in view of this disclosure. In embodiment, the disclosure can describe a process of preparing a self-expanding water soluble mandrel, including the steps of preparing a mold or tool, adding one or more water soluble binders and an expandable material to the tool, and curing the material to yield a water soluble self-expanding mandrel. The process can also include adding an offset to the tool or mold prior to the addition of the mandrel components in order to prepare the self-expanding water-soluble mandrel with external dimensions smaller than the internal dimensions of the tool or mold.

In an embodiment, the disclosure can describe a process for preparing a composite structure, including the steps of preparing a tool or mold, preparing a mandrel having external dimensions somewhat smaller than the internal dimensions of the tool or mold, spreading a composite material that will form the composite structure onto the surface of the mandrel, and heating the composite material and mandrel in the tool or mold to prepare the composite structure. The process can further include removing the mandrel from the inside of the composite structure by rinsing with water.

In an embodiment, the disclosure can describe a system for manufacturing a composite structure, including a tool or mold, a water soluble binder, an expandable material, and a composite compound. In another embodiment, the disclosure can describe a system for manufacturing a composite structure, including a self-expanding water soluble mandrel, a tool or mold, and a composite material. The tool can have internal dimensions that match the external dimensions of the composite structure.

In one embodiment of the disclosed self expanding mandrel a non water soluble binder may be utilized in conjunction with an expandable graphite based mixture to produce a composite shape where the mandrel is later removed simply by pouring out the remaining broken apart material after thermal expansion.

One advantage of the disclosed self-expanding mandrel includes the method of expansion. Because the expandable material is distributed evenly throughout the mandrel, the mandrel can expand during heating in an approximately uniform manner. Moreover, because the mandrel has been prepared with the same shape as the final composite structure, the overall expansion of the mandrel and the compression of the composite can be approximately uniform across the entire composite structure where the tool or mold is present. This can occur when the expansion occurs at the about same time as the composite material entering into a forming state. The expansion mandrel can be tailored to only squeeze once the composite system has entered into a low viscosity state that allows complex shape formation. In contrast, current technologies that rely on an expanding bladder or balloons are often plagued by uneven compression from the bladder to the composite material. Moreover, because the mandrel can be crafted using the mold or tool, shapes and dimensions of the final composite structure can be more complex and elaborate than are currently accessible with bladder or other technology.

Another advantage present in the disclosure is the ability to prepare much larger composite structures with long range consistent shapes and dimensions. The only limitation to the overall size or length of the composite structure is the ability to craft a tool or mold having those dimensions and the existence of an oven or furnace large enough to hold the tool or mold with the composite materials and mandrel therein. Longer range dimensions and higher complexity in a single uniform part can provide access to newer, more valuable composite structures that will be useful to a large variety of applications and industries.

Another advantage present in the disclosure is the ability to prepare uniform smooth composite structures. Because the expansion of the mandrel compresses the composite material against the inner surface of the tool or mold, the exterior surface of the final composite structure is easily controlled by how smooth or how rough the interior surface of the tool is designed to be.

Reference will now be made in detail to specific aspects of the disclosed materials, compounds, compositions, articles, and methods, examples of which are illustrated in the accompanying Examples and Figures.

EXAMPLES

Example 1

In one example, an air duct was created utilizing a bisphenol/epichlorohydrin-based impregnated woven carbon fiber pre-preg. A seamless air duct was formed by first producing an injection tool with the desired part shape machined into a splittable cavity. The tool was constructed to be ported to allow the carrier fluid to escape as needed. A binder/aggregate mixture was made by combining 80% cenosphere aggregate, 3% PVP, 3% sodium silicate (40 Baum) and 14% water. A green mandrel was then produced through injection of an aggregate/binder mixture into the carrier chamber under injection pressures of around 50 psi, with the carrier fluid being exhausted into environment. An acid gas ($CO_2$) was then passed into the tool cavity to partially harden the mandrel, under gas pressures of 40 psi or more, to ensure maximum contact with the mandrel. After 30 seconds of gassing, the tool cavity was split open and the mandrel ejected. The partially-hardened mandrel was then post-cured in a microwave oven for 90 seconds before sealing. Once sufficient water was removed, the mandrel was sealed, first utilizing a filler material (such as Holcote™) to close the mandrel's outer porosity and then finish coated with a plaster primer (such as Valspar™). After the sealer was completely dried, a release agent (such as Freecote™) was applied to the mandrel to aid in the release of the composite.

A prepreg composite material was then wrapped around the finished mandrel in a manner so as to produce uniformly distributed layers, as is familiar to those experienced in the art. After the composite material was laid up on the mandrel, a release layer was applied (such as Peel Ply, Pourous Release Film etc.). Then the mandrel was wrapped in a breather material, allowing a vacuum to be well-distributed around the mandrel. After the breather was applied, the mandrel was bagged in a vacuum-tight envelope and a vacuum was applied to the part. The part was then placed into an oven for curing at 150° F. for 1 hour. The resultant structure contains tightly packed carbon fiber with typically less than 40% epoxy, and the epoxy hardened to form a strong finished part. The part was then cooled, removed from the oven, and de-bagged, and the release layer was removed, leaving the finished part with the mandrel still intact.

To remove the mandrel, the part was submersed for several minutes in a container of water and rinsed out using jetted water. The mandrel was thereby dissolved and removed from the finished composite part, which was then allowed to dry, leaving a seamless hollow composite part. The total process from injection of the material to the finished composite part for this specific example was around two hours. The above example is intended to be a representative embodiment of the mandrel and methods described herein, and is not intended to be exclusive or limiting in any way.

The products, materials, methods, and machines disclosed herein provide several advantages over prior products, materials, methods, and machines. For example, in certain embodiments where a water-soluble binder is used, the mandrel may easily and rapidly be removed from the composite structure in less than a minute or two simply by immersing the composite structure and mandrel in a plain water bath or by subjecting then to steam. A particular advantage of the present invention is that machining and finishing operations on the mandrel can be eliminated and the mandrel may be used for forming of either interior or exterior complex product surfaces. Additionally, the mandrel is dimensionally stable and is able to withstand high pressures.

Example 2

Figure 10A:
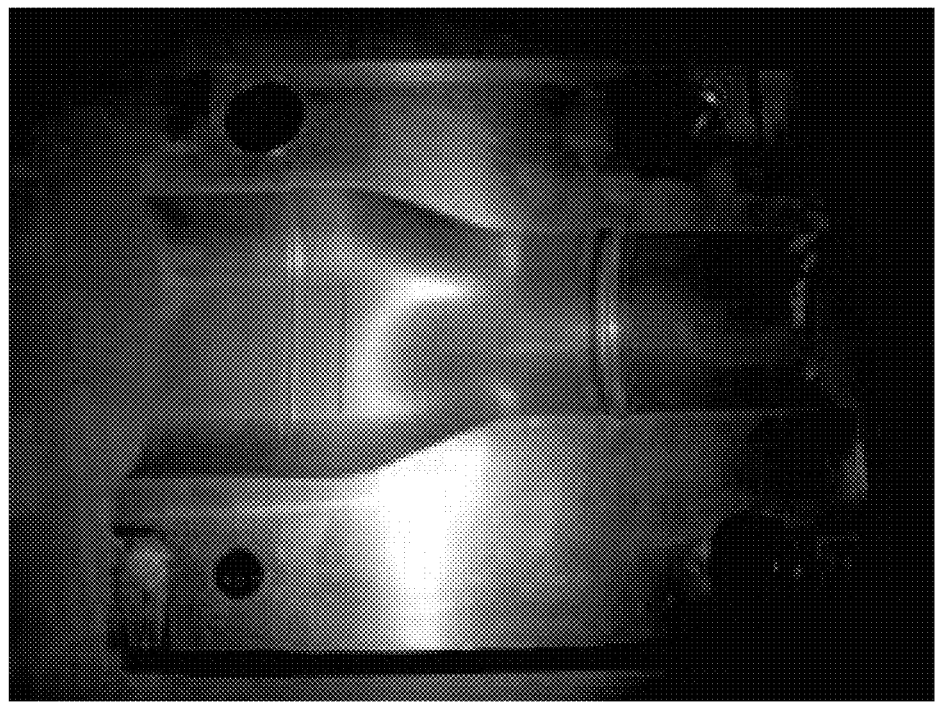
FIG. 10A-10I are photos of another exemplary embodiment of a process according to the present disclosure.
Figure 10B:
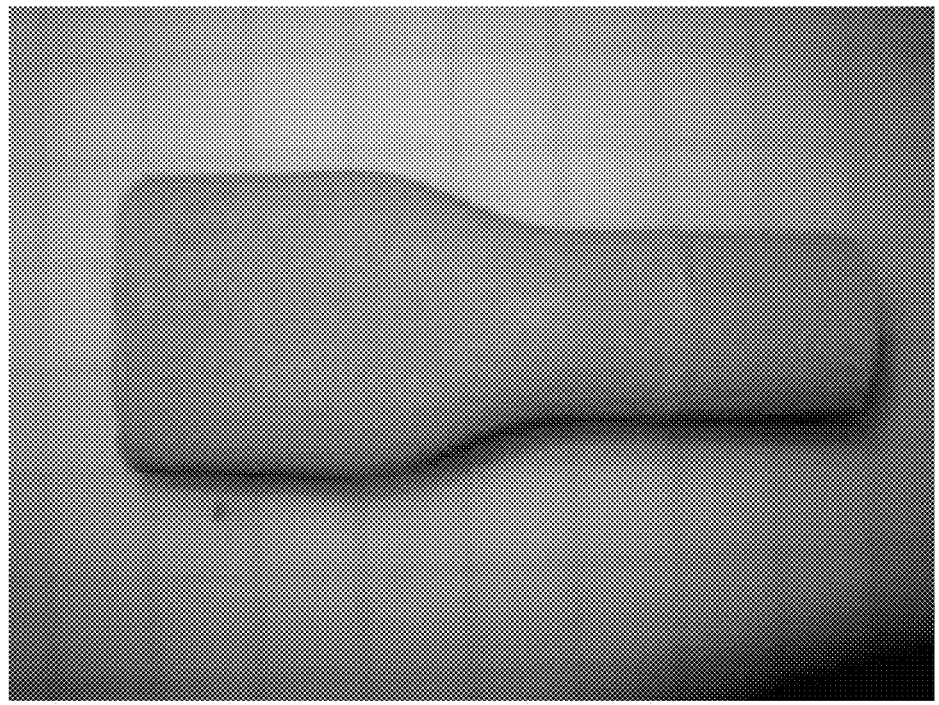
Figure 10C:
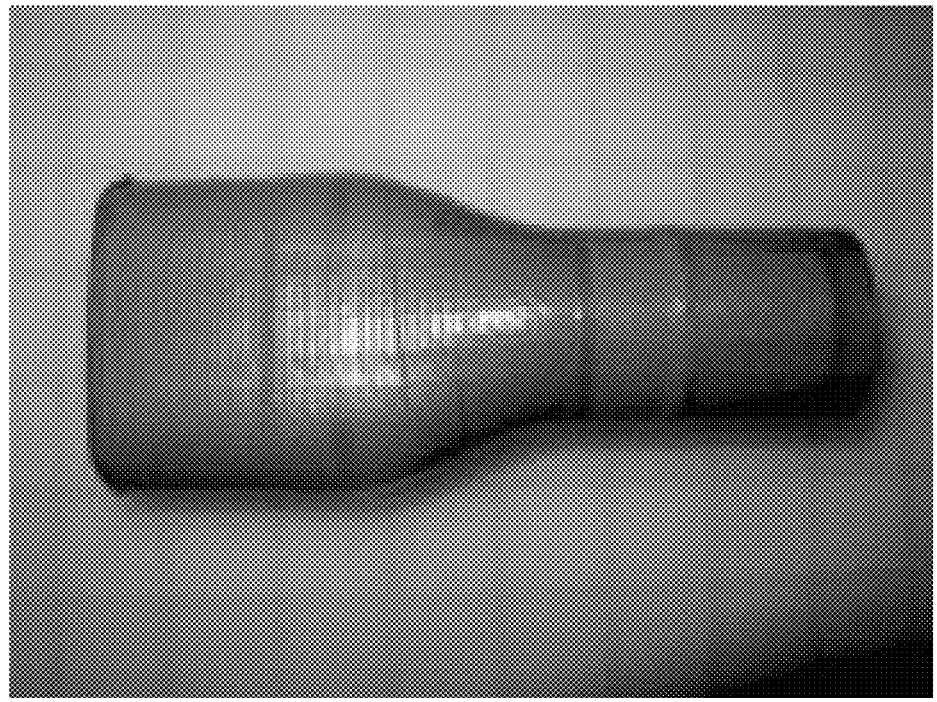
Figure 10D:
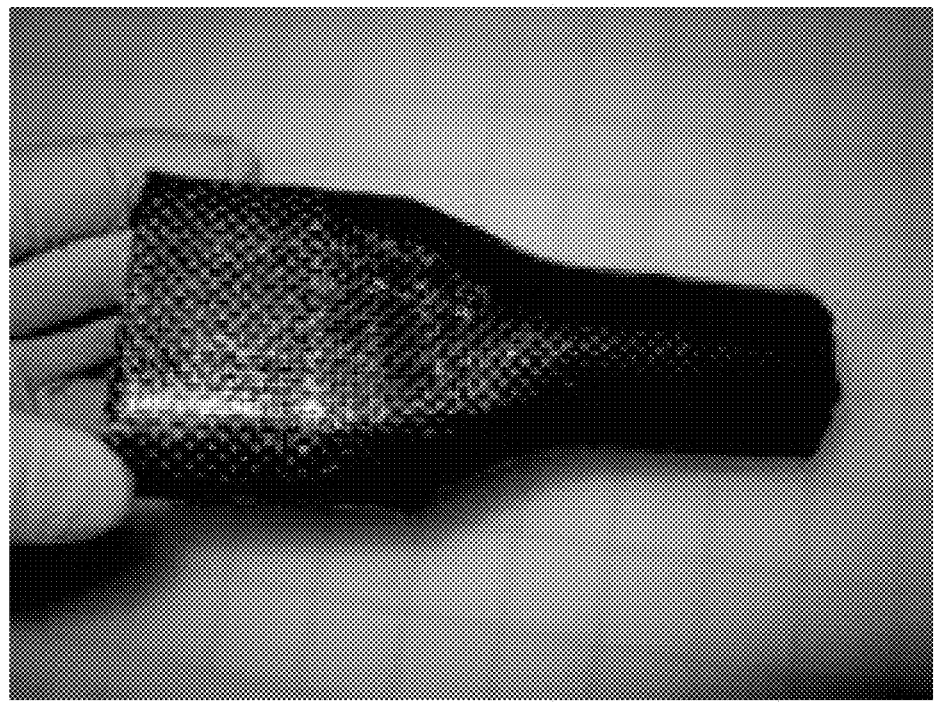
Figure 10E:
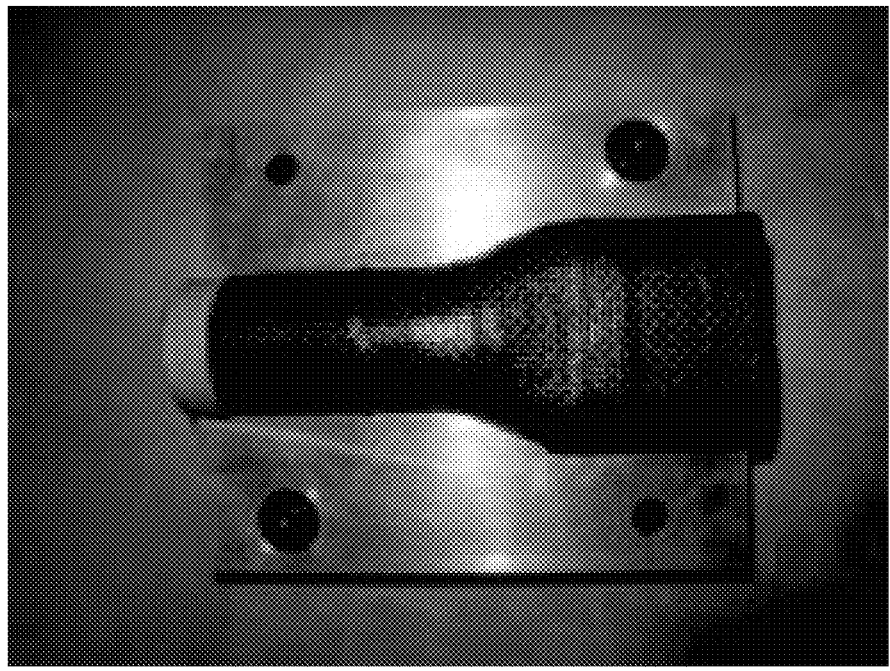
Figure 10F:
Figure 10G:
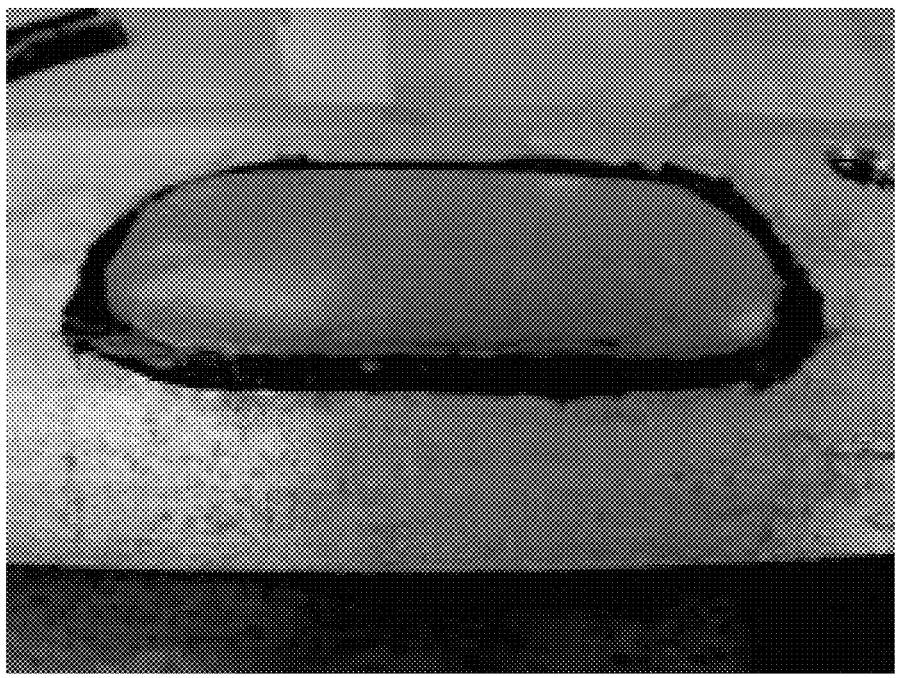
Figure 10H:
Figure 10I:
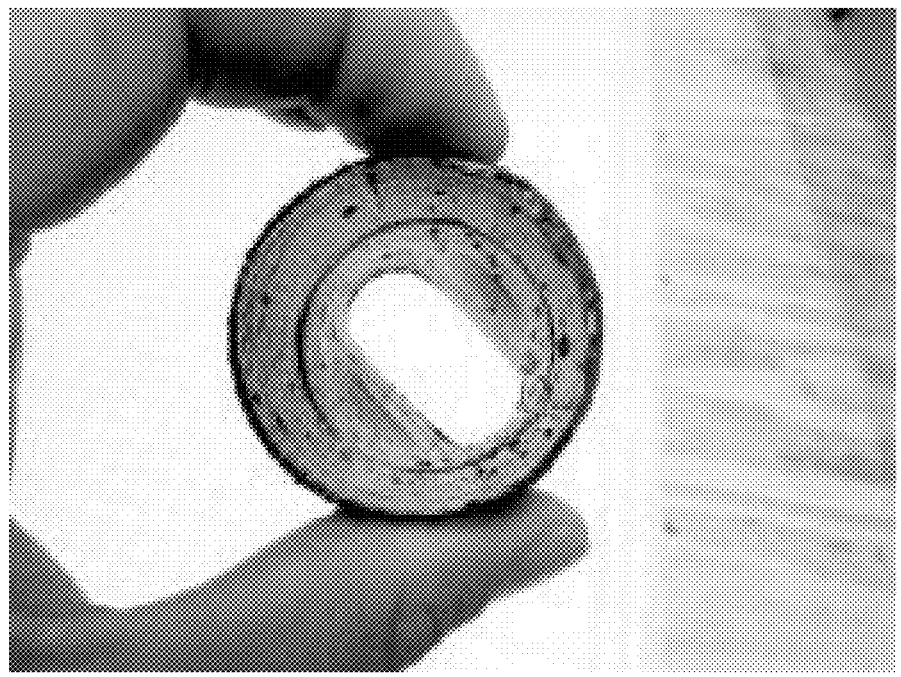

Construction of a composite structure using an expandable mandrel is shown in FIG. 10A to 10I. A mold, shown in FIG. 10A, was utilized to produced an undersized room temperature dimensionally stable mandrel, shown in FIG. 10B, by injecting or packing the water soluble polymer binder, filler, and the expandable material EXPANCEL™ and allowing it to dehydrate. The mandrel was covered with a non resin penetrating layer that allowed for expansion, shown in FIG. 10C, and wrapped with composite material that was near the desired finished shape, shown in FIG. 10D. The composite wrapped mandrel was placed into required OML tooling at room temperature, shown in FIG. 10E, and the mold was closed and thermally cured at 350° F. for 2 hours during which time the thermoplastic binder system that kept the mandrel stable at room temperature melted at the same time as the distillate in the Expancel expanded. The mandrel grew and applied pressure on the surrounding aggregate and composite resulting in consolidation of the material to the outer tool control surface. The softened material is shown in FIG. 10F at elevated temperature. At the same time, Expancel material bubbles up out of the tool from thermal expansion of the internal gasses. After cooling, the composite solidifies to a strong cured state and the internal expanded mandrel shrinks pulling the mandrel away from the interior composite surface, shown in FIG. 10G. The sealer of the inner mandrel is then penetrated and water is applied to dissolve the water soluble binder and the sealer is removed leaving an empty cavity The finished part has the exact oml tolerances as the controlled tooling surface, as shown in FIG. 10H and FIG. 10I.

Example 3

The same chemistry pathway in Example 1 can be incorporated into a 3DP platform technology using a with a reduced particle size for proper incorporation. This technique can to supply mandrels that are specifically offset to compensate for a desired composite ply thickness build up. With this technique, molds that have been previously fabricated for Silicon bladders or alternative 2 part mold techniques can be modified by supplying a digital CAD model modified for the decreased size. These can be rapidly prototyped and dehydrated for utilization as an expandable water soluble mandrel.

Example 4

In an effort to utilize the same fundamental approach to working on high temperature thermoplastic systems with trapped configurations another class of materials was investigate that elevated the use window for the expandable mandrel to temperatures in excess of 600'F. Expancel materials are limited to operating temperatures of less than 200'C (about 400° F.) before the thermoplastic casing of the sphere is compromised releasing the pressurized internal gas and in turn the pressurization effect of the mandrel. The high temperature mandrel material alternatively can utilize an expandable graphite based material to take the place of the Expancel media. In similar ratios the graphite is able to produce enough expansion to also allow consolidation of the thermoplastic material forming a complex hollow part at high temperature. The mandrel may then be removed with water to finish the operation or simply poured out as the binder material has been separated leaving a flowing powder.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. All component percentages described herein refer to weight percentages, unless specifically identified otherwise. The term "plurality," as used herein, indicates any number greater than one, either disjunctively or conjunctively, as necessary, up to an infinite number. Accordingly, while the specific embodiments have been illustrated and described, numerous modifications come to mind without significantly departing from the spirit of the invention and the scope of protection is only limited by the scope of the accompanying claims.

What is claimed is:

1. A self-expanding water-soluble mandrel comprising a water-soluble binder and an expandable material, wherein the water-soluble binder is a mixture comprising from 1 to 30 weight % polyvinylpyrolidone and from 1 to 20 weight % sodium silicate, wherein the expandable material comprises an expandable polymer particle or an expandable graphite, and wherein the expandable polymer particle or expandable graphite expands when subjected to heat, light, energy or chemical reaction.

2. The mandrel of claim 1, wherein the expandable material expands under thermal conditions between about 150° F. and about 700° F.

3. The mandrel of claim 1, wherein the expandable material comprises an expandable polymer particle that expands between about 200° F. and about 350° F.

4. The mandrel of claim 1, wherein the expandable material comprises an expandable graphite that expands between about 350° F. and about 650° F.

5. The mandrel of claim 1, wherein the self-expanding mandrel applies pressure to a composite material applied on the mandrel's surface.

6. A process for preparing a hollow composite structure, comprising the steps of
preparing a self-expanding water-soluble mandrel comprising a water-soluble binder and an expandable material,
wherein the water-soluble binder is a mixture comprising from 1 to 30 weight % polyvinylpyrolidone and from 1 to 20 weight % sodium silicate, and wherein the expandable material comprises an expandable polymer particle or an expandable graphite, and the expandable polymer particle or expandable graphite expands when subjected to heat, light, energy or chemical reaction,
covering the water-soluble mandrel with a composite material,
heating the water-soluble mandrel and composite material to between 150-700° F. to form the composite structure with the water-soluble mandrel contained therein,
cooling the water-soluble mandrel and composite material, and washing the water-soluble mandrel out of the composite structure with water to yield the hollow composite structure.

7. The process of claim 6, wherein the water-soluble mandrel and the composite material are heated inside a tool to compress the composite material against the internal surface of the tool.

8. The process according to claim 6, further comprising the initial step of preparing a tool matching the external dimensions of the hollow composite structure, and conducting the heating of the water-soluble mandrel and composite material inside the tool.

9. The process according to claim 8, wherein the water-soluble mandrel is prepared inside the tool with an offset structure.

10. The mandrel of claim 1, wherein the water-soluble binder is a mixture comprising polyvinylpyrolidone from 3% to 30% weight of the mixture and sodium silicate from 3% to 20% weight of the mixture.

11. The mandrel of claim 10, wherein the mixture comprises from 3% to 10% weight polyvinylpyrolidone and from 3% to 10% weight sodium silicate.

12. The process of claim 6, wherein the water-soluble binder is a mixture comprising polyvinylpyrolidone from 3% to 30% weight of the mixture and sodium silicate from 3% to 20% weight of the mixture.

13. The process of claim 12, wherein the mixture comprises from 3% to 10% weight polyvinylpyrolidone and from 3% to 10% weight % sodium silicate.

\* \* \* \* \*